(12) United States Patent
Senda

(10) Patent No.: US 8,897,601 B2
(45) Date of Patent: Nov. 25, 2014

(54) IMAGE CONVERSION PARAMETER CALCULATION DEVICE, IMAGE CONVERSION PARAMETER CALCULATION METHOD, AND PROGRAM

(75) Inventor: Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 275 days.

(21) Appl. No.: 13/498,263

(22) PCT Filed: Sep. 9, 2010

(86) PCT No.: PCT/JP2010/005518
§ 371 (c)(1),
(2), (4) Date: Apr. 10, 2012

(87) PCT Pub. No.: WO2011/036851
PCT Pub. Date: Mar. 31, 2011

(65) Prior Publication Data
US 2013/0064451 A1   Mar. 14, 2013

(30) Foreign Application Priority Data

Sep. 28, 2009   (JP) .................................. 2009-223038

(51) Int. Cl.
*G06K 9/32* (2006.01)
*G06K 9/66* (2006.01)
*G06T 7/00* (2006.01)

(52) U.S. Cl.
CPC ..... *G06T 7/0024* (2013.01); *G06T 2207/20016* (2013.01)
USPC .......................................... 382/294; 382/190

(58) Field of Classification Search
None
See application file for complete search history.

(56) References Cited

U.S. PATENT DOCUMENTS 6,272,247 B1   8/2001   Manickam et al.
8,553,111 B2   10/2013  Tsuruoka

FOREIGN PATENT DOCUMENTS

| JP | 08-235357 | 9/1996 |
| JP | 2002-516440 | 6/2002 |
| JP | 2009-104228 | 5/2009 |
| JP | 2009-116730 | 5/2009 |
| JP | 2009-124552 | 6/2009 |

OTHER PUBLICATIONS

Bartoli, Adrien, "Groupwise Geometric and Photometric Direct Image Registration" IEEE Transactions on Pattern Analysis and Machine Intelligence, vol. 30, No. 12, Dec. 2008, 11 pages.*
International Search Report, PCT/JP2010/005518, Oct. 5, 2010.
Baker et al., "Lucas-Kanade 20 Years on: A Unifying Framework", International Journal of Computer Vision, vol. 56, No. 3, pp. 221-255, 2004.
Japanese Official Action—2011-532899—Aug. 26, 2014.

* cited by examiner

*Primary Examiner* — Jason M Repko
*Assistant Examiner* — Ryan P Potts
(74) *Attorney, Agent, or Firm* — Young & Thompson

(57) ABSTRACT

An image conversion parameter calculation device accurately calculates a conversion parameter for image alignment with a processing amount that does not depend on the size of an image to be aligned. A pixel selection element randomly selects pixels from a predetermined number or pixels of not more than the predetermined number from a first image. A parameter derivation element derives a conversion parameter by performing processing for pixels selected by the pixel selection element, the conversion parameter being a parameter for converting, to the first image, a second image that is subject to image alignment with the first image.

8 Claims, 10 Drawing Sheets

FIG. 9A $\begin{bmatrix} -1 & -1 & 0 & 1 & 1 \\ -1 & -1 & 0 & 1 & 1 \\ -1 & -1 & 0 & 1 & 1 \end{bmatrix}$ FIG. 9B $\begin{bmatrix} 1 & 1 & 1 \\ 1 & 1 & 1 \\ 1 & 1 & 1 \end{bmatrix}$ $\begin{bmatrix} -1 & 0 & 1 \end{bmatrix}$ FIG. 9C $\begin{bmatrix} -1 & -1 & -1 \\ -1 & -1 & -1 \\ 0 & 0 & 0 \\ 1 & 1 & 1 \\ 1 & 1 & 1 \end{bmatrix}$ FIG. 9D $\begin{bmatrix} 1 & 1 & 1 \\ 1 & 1 & 1 \\ 1 & 1 & 1 \end{bmatrix}$ $\begin{bmatrix} -1 \\ 0 \\ 1 \end{bmatrix}$

IMAGE CONVERSION PARAMETER CALCULATION DEVICE, IMAGE CONVERSION PARAMETER CALCULATION METHOD, AND PROGRAM

TECHNICAL FIELD

The present invention relates to an image conversion parameter calculation device, an image conversion parameter calculation method, and an image conversion parameter calculation program.

BACKGROUND ART

Even when imaging the same object, there is a possibility that the object in the image is displaced due to a displacement in camera position and the like. In such a case, image alignment is performed by converting one image so that the object in the image is at the same location as the object in the other image. Methods for calculating a conversion parameter of conversion effecting such image alignment can be classified into a feature point-based method and a region-based method.

The feature point-based method is a method of extracting feature points from each of the two images subject to the alignment and associating the feature points between the images to calculate the conversion parameter.

The region-based method is a method of specifying such conversion that minimizes a difference in luminance (pixel value) between the images. A gradient method is known as the region-based method. The region-based method is also called the Lucas Kanade method.

The region-based method is described in Non Patent Literature (NPL) 1. In the method described in NPL 1, the conversion parameter is converged by repeatedly calculating a conversion parameter update and updating the conversion parameter. In NPL 1, conversion parameter update modes are classified into an additive algorithm and a compositional algorithm. The additive algorithm is an algorithm of updating the conversion parameter by addition of the conversion parameter update to the conversion parameter. The compositional algorithm is an algorithm of updating the conversion parameter by composition of the conversion parameter with the conversion parameter update.

In NPL 1, there is also classification into a forward algorithm and an inverse algorithm, in view of whether, in the case of converting one image to align it with the other image (template image), the conversion parameter update is derived based on the image to be converted or the template image. The forward algorithm is an algorithm of calculating the conversion parameter update based on the image to be converted. The inverse algorithm is an algorithm of calculating the conversion parameter update based on the template image.

Since each of the additive algorithm and the compositional algorithm can be classified into the forward algorithm and the inverse algorithm, four types of algorithms are available.

An image alignment method developed from the method described in NPL 1 is described in Patent Literature (PTL) 1. In the method described in PTL 1, when aligning the input image and the template image, a notice area is set in the template image, pixels smaller in number than all pixels in the notice area are selected from all pixels in the notice area, and the conversion parameter is estimated using only the selected pixels. A method of spatially thinning out pixels in the notice area is presented as a method for selecting pixels smaller in number than all pixels in the notice area from all pixels in the notice area. In more detail, a method of selecting spatially discrete pixels from the pixels in the notice area is presented. For example, a method of selecting pixels at intervals of 10 pixels from the pixels in the notice area is presented.

PTL 1 also describes selecting pixels based on partial derivatives of all pixels in the template image with respect to the deformation parameter. In more detail, PTL 1 describes that a partial derivative is determined for each pixel and pixels whose partial derivatives are higher than a threshold are selected, and also that a level of importance calculated from the partial derivative is determined for each pixel and pixels whose levels of importance are higher than a threshold are selected.

A pyramidal Lucas Kanade method is described in PTL 2. In the pyramidal Lucas Kanade method, alignment is possible even in the case where there is a large degree of deformation between the images to be aligned.

CITATION LIST

Patent Literature

PTL 1: Japanese Patent application Laid-Open No. 2009-104228

PTL 2: Japanese Patent application Laid-Open No. 2009-116730

Non Patent Literature

NPL 1: S. Baker and I. Matthews, Lucas-Kanade 20 Years On: A Unifying Framework, International Journal of Computer Vision, Vol. 56, No. 3, pp. 221-255, 2004

SUMMARY OF INVENTION

Technical Problem

The feature point-based method has a problem that the accuracy of the conversion parameter decreases in the case where appropriate feature points cannot be extracted or in the case where the feature points cannot be properly associated with each other.

The region-based method typically has a difficulty in executing high-speed processing, because of high computational complexity. In the method described in PTL 1, only the selected pixels are used to estimate the conversion parameter, which contributes to reduced computational complexity. However, the processing amount depends on the image size (i.e. the number of pixels in the image), so that an increase in image size leads to an increase in processing amount. For instance, though the example of selecting pixels at intervals of 10 pixels is shown in PTL 1, the number of selected pixels increases with an increase in image size, as a result of which the processing amount increases. In the pyramidal Lucas Kanade method described in PTL 2, too, the processing amount increases with an increase in size of the image to be processed.

Moreover, in the method described in PTL 1, the pixels are spatially thinned out. This method has a problem that the pixel values of the selected pixels are biased when there is periodicity in pixel value of the image. For example, if the intervals between the selected pixels when selecting the pixels by spatially thinning out the pixels match the cycles of pixel value changes, the pixel values of the selected pixels will end up being similar to each other. In such a case, it is impossible to accurately calculate the conversion parameter.

In view of the above, an exemplary object of the present invention is to provide an image conversion parameter calculation device, an image conversion parameter calculation method, and an image conversion parameter calculation program, and an image conversion parameter calculation program capable of accurately calculating a conversion parameter for image alignment with a processing amount that does not depend on a size of an image to be aligned.

Solution to Problem

An image conversion parameter calculation device according to an exemplary aspect of the present invention comprises: pixel selection means for randomly selecting a pixel of a predetermined number or pixel of not more than the predetermined number from a first image; and parameter derivation means for deriving a conversion parameter by performing processing for selected pixels which are the pixels selected by the pixel selection means, the conversion parameter being a parameter for converting, to the first image, a second image that is subject to image alignment with the first image.

An image conversion parameter calculation method according to an exemplary aspect of the present invention comprises: randomly selecting a pixel of a predetermined number or pixel of not more than the predetermined number from a first image; and deriving a conversion parameter by performing processing for selected pixels which are the pixels selected, the conversion parameter being a parameter for converting, to the first image, a second image that is subject to image alignment with the first image.

An image conversion parameter calculation program according to an exemplary aspect of the present invention causes a computer to execute: a pixel selection process of randomly selecting a pixel of a predetermined number or pixel of not more than the predetermined number from a first image; and a parameter derivation process of deriving a conversion parameter by performing processing for selected pixels which are the pixels selected in the pixel selection process, the conversion parameter being a parameter for converting, to the first image, a second image that is subject to image alignment with the first image.

Advantageous Effects of Invention

According to the present invention, it is possible to accurately calculate a conversion parameter for image alignment with a processing amount that does not depend on a size of an image to be aligned.

BRIEF DESCRIPTION OF DRAWINGS

FIGS. 9A-9D It depicts an explanatory diagram showing examples of a filter used for calculating $\nabla T_R$ in first preprocessing in Exemplary Embodiment 3.

DESCRIPTION OF EMBODIMENT

The following describes exemplary embodiments of the present invention with reference to drawings.

Four types of algorithms are available by combining any of the additive algorithm and the compositional algorithm with any of the forward algorithm and the inverse algorithm. Any of these four types of algorithms is applicable to the present invention. The following describes an example where the combination of the compositional algorithm and the inverse algorithm is applied to the present invention. The algorithm that combines the compositional algorithm and the inverse algorithm is hereafter referred to as an inverse compositional algorithm.

Exemplary Embodiment 1

Figure 1:
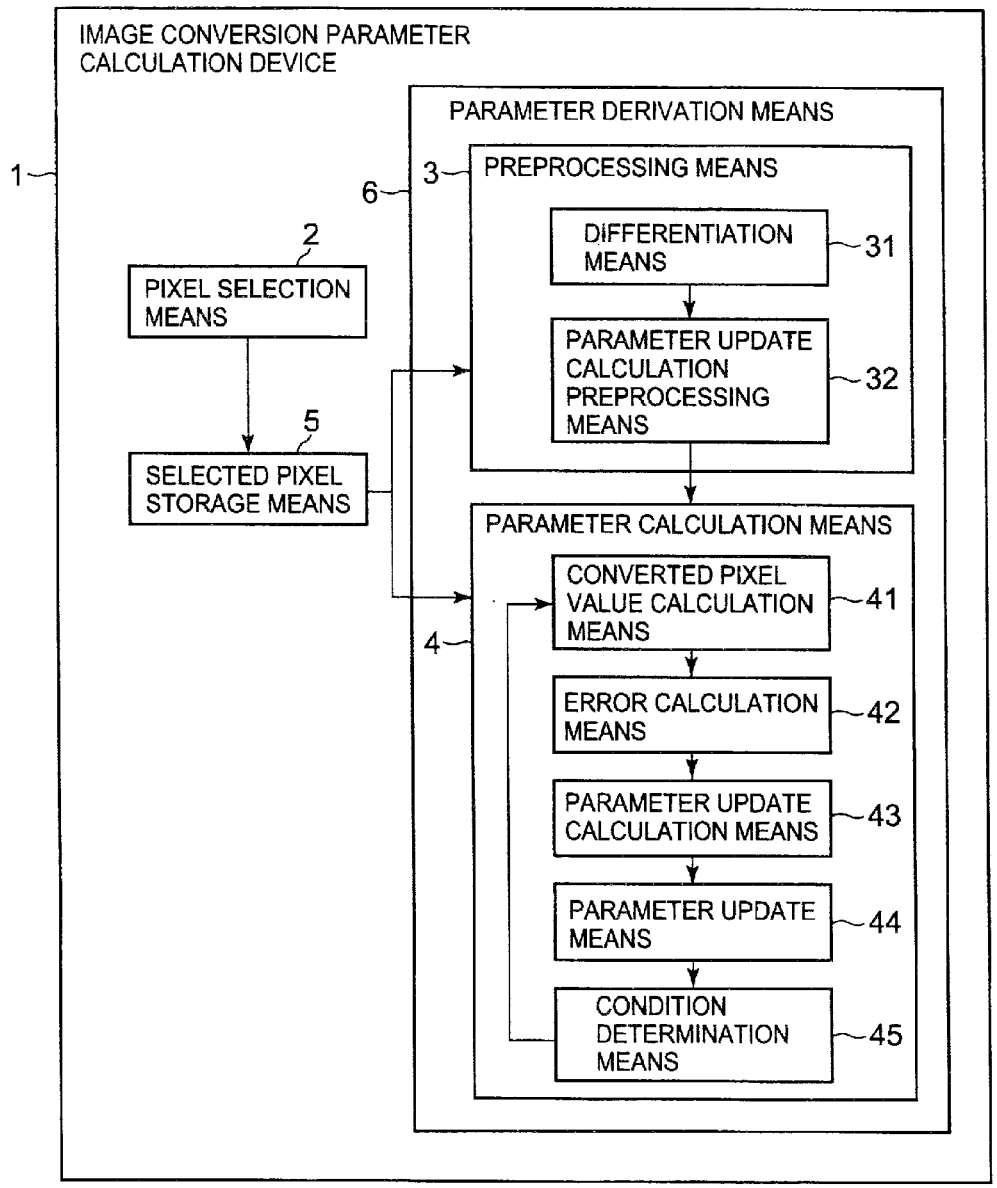
FIG. 1 It depicts a block diagram showing an example of an image conversion parameter calculation device in Exemplary Embodiment 1 of the present invention.

FIG. 1 is a block diagram showing an example of an image conversion parameter calculation device in Exemplary Embodiment 1 of the present invention. The following describes an example where an image conversion parameter calculation device 1 according to the present invention stores a template image and calculates a conversion parameter for converting an input image received from outside so that an object in the input image is aligned with the object in the template image. Note, however, that a structure in which the template image is received from outside with the input image is also applicable. In the following description, the template image is also denoted by the symbol T, and the input image by the symbol I.

The image conversion parameter calculation device 1 according to the present invention includes pixel selection means 2, selected pixel storage means 5, and parameter derivation means 6.

The pixel selection means 2 randomly selects pixels from the template image. The number of pixels selected from the template image may be determined beforehand.

In the case where the number of pixels of each of the template image and the input image is set to a fixed number (i.e. in the case where the image size is fixed), a predetermined number of locations of pixels selected from the template image may be determined beforehand. Such pixel selection locations are determined beforehand, as random locations with no regularity. In this case, the pixel selection means 2 only needs to select pixels at the pixel selection locations determined beforehand, from the pixels in the template image. By selecting the pixels in this way, the pixels can be randomly selected even when the template image is replaced on a precondition that the number of pixels of the template image is fixed.

In the case where the number of pixels of the template image used for image alignment is not necessarily limited to a fixed number, for example, the pixel selection means 2 may generate, for each of x and y coordinates, a random number in a range from minimum to maximum coordinates of a pixel, and select a pixel whose coordinate value corresponds to the generated random number. Alternatively, the pixel selection means 2 may generate a random number so that a pixel can be uniquely identified from the generated random number, and select a pixel that is uniquely identified from the generated random number. The pixel selection means 2 may perform this process of generating a random number and selecting a pixel identified from the random number, a predetermined number of times. In this case, when the same random number is generated more than once, the same pixel is selected more than once, which leads to a situation where the number of selected pixels is smaller than the number of times a random number is generated. That is, even when a random number is generated the predetermined number of times in order to select the desired number of pixels, there is a possibility that the number of selected pixels is smaller than the desired number. Such a decrease in the number of pixels is, however, negligible. Though the pixel selection means 2 may increase the number of times a random number is generated so that the desired number of pixels are obtained in the case where the same random number is generated more than once, the processing amount increases with the increase in the number of times a random number is generated. Accordingly, the pixel selection means 2 may end the pixel selection at the time when the process of generating a random number and selecting a pixel is performed the predetermined number of times.

As an alternative, the pixel selection means 2 may create a random pixel set in which all pixels of the template image are arranged in random order, and select the predetermined number of pixels from the random pixel set. In this way, too, the pixels can be randomly selected.

Note that the above-mentioned pixel selection process is merely an example, and the pixel selection process by the pixel selection means 2 is not limited to the above-mentioned example. The pixel selection means 2 may select pixels from the template image by any other method so long as it is a process of randomly selecting pixels in the template image.

Hereafter, in the case of denoting each pixel (selected pixel) selected from the template image T by the pixel selection means 2 by a symbol, the symbol $T_R$ is used. The pixel may also be simply referred to as "selected pixel" or the like, without using the symbol $T_R$.

The selected pixel storage means 5 is a storage device for storing the locations and the pixel values (luminance values) of the pixels in the template image selected by the pixel selection means 2. The pixel selection means 2 stores the locations and the pixel values of the selected pixels in the selected pixel storage means 5. As the locations of the selected pixels, the coordinates may be stored as an example. In the case where a pixel can be uniquely identified from each random number generated by the pixel selection means 2 and a random number value represents a pixel location, the pixel selection means 2 may store the generated random numbers in the selected pixel storage means 5 instead of the coordinates, as information indicating the locations of the selected pixels.

The parameter derivation means 6 derives a conversion parameter for converting the input image so as to be aligned with the template image, by performing processing for the selected pixels selected by the pixel selection means 2. The parameter derivation means 6 does not perform processing for pixels not selected by the pixel selection means 2.

The parameter derivation means 6 includes preprocessing means 3 and parameter calculation means 4. The parameter calculation means 4 determines the conversion parameter for converting the input image to the template image, by repeatedly performing a process of calculating a conversion parameter update and updating the conversion parameter. Here, the parameter calculation means 4 may start the process from a predetermined initial value of the conversion parameter. By updating the conversion parameter starting from this initial value, the parameter calculation means 4 determines the conversion parameter. The preprocessing means 3 and the parameter calculation means 4 perform processing for the selected pixels, with reference to the locations and the pixel values of the selected pixels stored in the selected pixel storage means 5.

The preprocessing means 3 executes preprocessing of the process performed by the parameter calculation means 4.

The preprocessing means 3 includes differentiation means 31 and parameter update calculation preprocessing means 32.

The differentiation means 31 calculates a derivative (gradient) in the pixel $T_R$ selected from the template image T. The derivative is denoted by $\nabla T_R$. The differentiation means 31 calculates $\nabla T_R$ for each selected pixel $T_R$. When calculating $\nabla T_R$ for each selected pixel, the differentiation means 31 uses pixel values of neighboring pixels of the selected pixel for which $\nabla T_R$ is to be calculated. That is, the differentiation means 31 calculates $\nabla T_R$ not from the entire template image T but from the neighboring pixels of the selected pixel. In Exemplary Embodiment 1, the differentiation means 31 calculates $\nabla T_R$ from pixel values of pixels adjacent to the selected pixel. A specific method of calculating $\nabla T_R$ will be described later.

The parameter update calculation preprocessing means 32 performs preprocessing of the conversion parameter update calculation by the parameter calculation means 4. The parameter update calculation preprocessing means 32 performs the preprocessing using $\nabla T_R$. An example of using the inverse compositional algorithm is described in Exemplary Embodiment 1. The parameter update calculation preprocessing means 32 to which the inverse compositional algorithm is applied will be described later.

In the case of applying any other algorithm, on the other hand, the parameter update calculation preprocessing means 32 may perform preprocessing according to the applied algorithm.

The parameter calculation means 4 includes converted pixel value calculation means 41, error calculation means 42, parameter update calculation means 43, parameter update means 44, and condition determination means 45.

The converted pixel value calculation means 41 converts, based on the conversion parameter, coordinates of a pixel location in the input image I corresponding to the selected pixel selected from the template image T, to interpolate a pixel value. By this process, the converted pixel value calculation means 41 calculates the pixel value at the converted pixel location when converting the coordinates of the pixel in the input image corresponding to the selected pixel. Converting/Warping coordinates of a pixel location X using a conversion parameter p is denoted by the symbol W(X; p). The converted pixel value calculated by the converted pixel value calculation means 41 is denoted by I(W(X; p)). I(W(X; p)) is calculated not by processing performed on the entire image, but by processing for the selected pixel.

An example of the conversion W(X; p) is given below. As an example, a translation can be represented using two parameters (denoted by $p_1$ and $p_2$) as the conversion parameter p. In the case of a translation, the conversion W(X; p) can be represented by Expression (1) below.

$$W(X; p) = \begin{pmatrix} x + p_1 \\ y + p_2 \end{pmatrix} \quad \text{Expression (1)}$$

As another example, an affine transformation can be represented using six parameters (denoted by $p_1$ to $p_6$) as the conversion parameter p. In the case of an affine transformation, the conversion W(X; p) can be represented by Expression (2) below.

$$W(X; p) =$$
$$\begin{pmatrix} (1+p_1)x + p_3 y + p_5 \\ p_2 x + (1+p_4)y + p_6 \end{pmatrix} = \begin{pmatrix} 1+p_1 & p_3 & p_5 \\ p_2 & 1+p_4 & p_6 \end{pmatrix} \begin{pmatrix} x \\ y \\ 1 \end{pmatrix} \quad \text{Expression (2)}$$

The error calculation means 42 calculates an error between the pixel value I(W(X; p)) at the converted pixel location when converting the coordinates of the pixel in the input image corresponding to the selected pixel, and the pixel value (denoted by $T_R(X)$) of the selected pixel from the template image T. That is, the error calculation means 42 calculates I(W(X; p))−$T_R(X)$, with regard to the corresponding I(W(X; p)) and $T_R(X)$.

Note that, when the pixel location of the selected pixel $T_R$ is denoted by coordinates (x, y), the pixel value of the pixel is also denoted by $T_R(x, y)$. The pixel values of the neighboring pixels are also denoted by $T_R(x+1, y)$, $T_R(x−1, y)$, $T_R(x, y+1)$, and $T_R(x, y−1)$ using their coordinates.

The parameter update calculation means 43 calculates the conversion parameter update using the processing result of the preprocessing means 3. The conversion parameter update is denoted by Δp. A method of calculating Δp in the inverse compositional algorithm will be described later.

The parameter update means 44 updates the current conversion parameter using the conversion parameter update Δp. Since an example of applying the inverse compositional algorithm is used here, the parameter update means 44 updates the conversion parameter by composition of the current conversion parameter with Δp.

In the case of applying an algorithm other than the inverse compositional algorithm, the parameter update calculation means 43 may calculate Δp by a method corresponding to the applied algorithm. Further, the parameter update means 44 may update the conversion parameter by a method corresponding to the applied algorithm.

The condition determination means 45 determines whether or not a predetermined condition is satisfied. In the case where the predetermined condition is satisfied, the condition determination means 45 determines the most recent conversion parameter updated by the parameter update means 44, as the conversion parameter for converting the input image to the template image.

The parameter derivation means 6 including the preprocessing means 3 (the differentiation means 31 and the parameter update calculation preprocessing means 32) and the parameter calculation means 4 (the converted pixel value calculation means 41, the error calculation means 42, the parameter update calculation means 43, the parameter update means 44, and the condition determination means 45) and the pixel selection means 2 are realized, for example, by a CPU of a computer operating according to an image conversion parameter calculation program. In this case, the image conversion parameter calculation program may be stored in a program storage device (not shown) of the computer, with the CPU reading the program and, according to the program, operating as the pixel selection means 2 and each means included in the parameter derivation means 6. Alternatively, each means shown in FIG. 1 may be realized by separate hardware.

The following describes operations.

Figure 2:
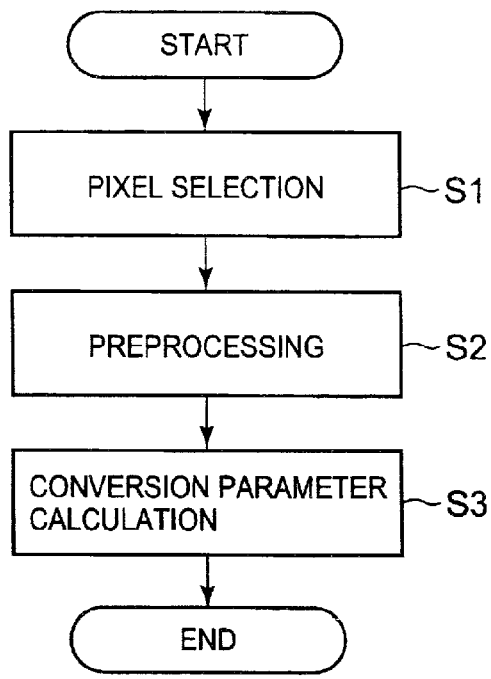
FIG. 2 It depicts a flowchart showing an example of processes in Exemplary Embodiment 1.

FIG. 2 is a flowchart showing an example of processes in Exemplary Embodiment 1. It is assumed here that the input image has already been input to the image conversion parameter calculation device.

First, the pixel selection means 2 randomly selects the predetermined number of pixels from the template image (step S1). As mentioned earlier, the pixel selection means 2 may, for example, perform the process of generating a random number and selecting a pixel corresponding to the random number, the predetermined number of times. As an alternative, the pixel selection means 2 may randomly select the predetermined number of pixels by another method. In the case of selecting pixels using random numbers, there is a possibility that the number of selected pixels does not reach the predetermined number due to the generation of the same random number more than once. Such a decrease in the number of pixels is, however, negligible, and accordingly the exact predetermined number of pixels may not be selected.

The pixel selection means 2 stores the pixel locations and the pixel values of the pixels selected from the template image in the selected pixel storage means 5 in step S1.

Next, the preprocessing means 3 performs the preprocessing (step S2). Following this, the parameter calculation means 4 determines the conversion parameter by repeatedly calculating the conversion parameter update and updating the conversion parameter using the preprocessing result (step S3).

Figure 3:
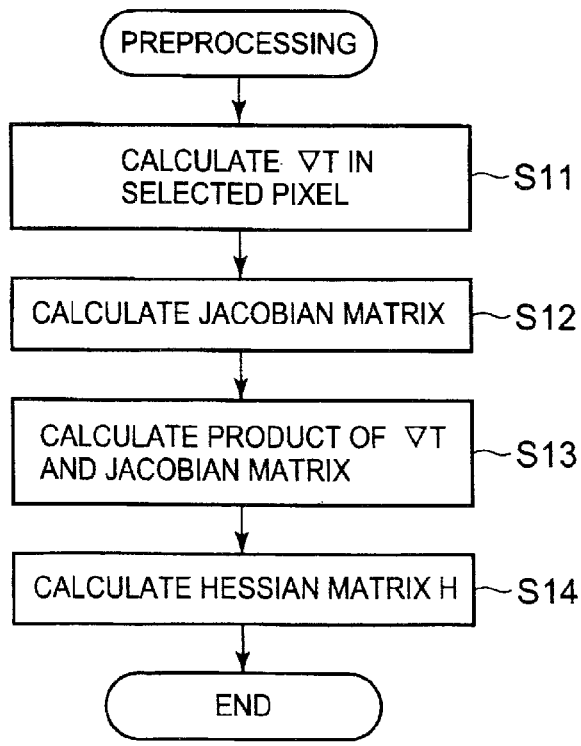
FIG. 3 It depicts a flowchart showing an example of a process of preprocessing (step S2).

FIG. 3 is a flowchart showing an example of a process of preprocessing (step S2). In the preprocessing (step S2), first the differentiation means 31 calculates the derivative $\nabla T_R$ in each selected pixel randomly selected from the template image (step S11). In detail, the differentiation means 31 calculates $\nabla T_R$ in the x direction and $\nabla T_R$ in the y direction. When the coordinates of the selected pixel $T_R$ are denoted by (x, y), $\nabla T_R$ in the x direction and $\nabla T_R$ in the y direction in the selected pixel are respectively denoted by $\nabla T_{Rx}(x, y)$ and $\nabla T_{Ry}(x, y)$.

In Exemplary Embodiment 1, the pixel values of the pixels adjacent to the selected pixel are used when calculating $\nabla T_R$ in the selected pixel. That is, in the case of calculating $\nabla T_{Rx}(x, y)$, the differentiation means 31 performs convolution of a filter (−1 0 1) on the selected pixel. In detail, the differentiation means 31 calculates $\nabla T_{Rx}(x, y)$ according to Expression (3) below.

$$\nabla T_{Rx}(x,y) = \{T_R(x+1,y) - T_R(x-1,y)\}/2 \quad \text{Expression (3)}$$

On the other hand, in the case of calculating $\nabla T_{Ry}(x, y)$, the differentiation means 31 performs convolution of a filter $(-1\ 0\ 1)^T$ on the selected pixel. T denotes a transposed matrix. In detail, the differentiation means 31 calculates $\nabla T_{Ry}(x, y)$ according to Expression (4) below.

$$\nabla T_{Ry}(x,y) = \{T_R(x,y+1) - T_R(x,y-1)\}/2 \quad \text{Expression (4)}$$

Next, the parameter update calculation preprocessing means 32 calculates, for each selected pixel, a Jacobian matrix with respect to the conversion W(X; p) (step S12). It is assumed here that (X; p) in the conversion W(X; p) is (X; 0).

When W(X; p) is represented by an x component and a y component so that $W(X; p) = (W_x(X; p), W_y(X; p))^T$, the Jacobian matrix with respect to W(X; p) is represented by Expression (5) below.

$$\frac{\partial W}{\partial p} = \begin{pmatrix} \frac{\partial W_x}{\partial p_1} & \frac{\partial W_x}{\partial p_2} & \cdots & \frac{\partial W_x}{\partial p_n} \\ \frac{\partial W_y}{\partial p_1} & \frac{\partial W_y}{\partial p_2} & \cdots & \frac{\partial W_y}{\partial p_n} \end{pmatrix} \quad \text{Expression (5)}$$

The Jacobian matrix is calculated not by processing performed on the entire image but by processing for the selected pixel.

After step S12, the parameter update calculation preprocessing means 32 calculates, for each selected pixel, a product of $\nabla T_R$ calculated in step S11 and the Jacobian matrix calculated in step S12. That is, the parameter update calculation preprocessing means 32 calculates Expression (6) below (step S13).

$$\nabla T_R \frac{\partial W}{\partial p} \quad \text{Expression (6)}$$

The parameter update calculation preprocessing means 32 then calculates a Hessian matrix H using the result obtained in step S13 for each selected pixel (step S14). The parameter update calculation preprocessing means 32 may calculate the Hessian matrix H according to Expression (7) below.

$$H = \sum_x \left[ \nabla T_R \frac{\partial W}{\partial p} \right]^T \left[ \nabla T_R \frac{\partial W}{\partial p} \right] \quad \text{Expression (7)}$$

The preprocessing (step S2 in FIG. 2) ends as a result of completing step S14.

Figure 4:
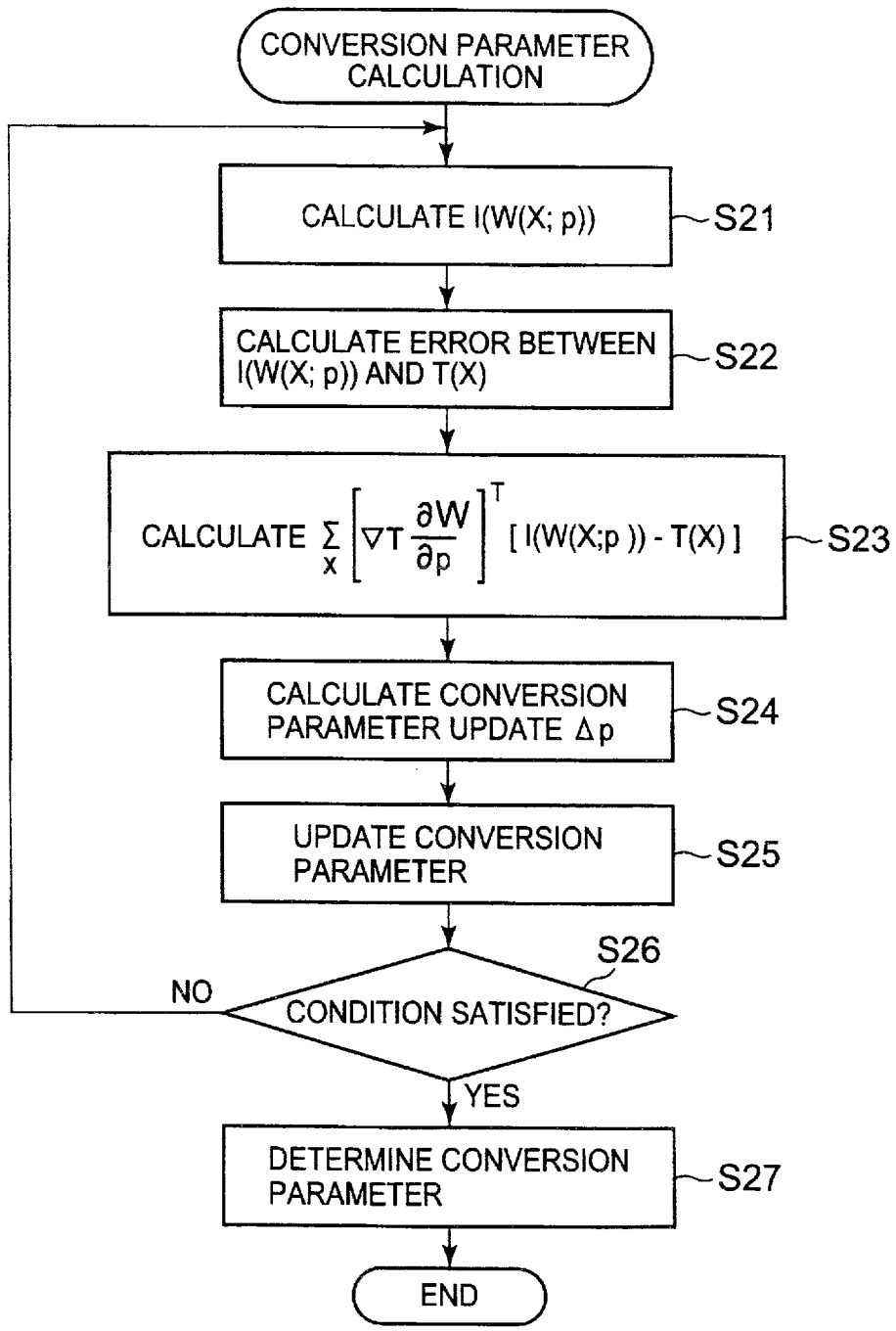
FIG. 4 It depicts a flowchart showing an example of a process of conversion parameter calculation (step S3).

The following describes the conversion parameter calculation (step S3 in FIG. 2) performed after the preprocessing. FIG. 4 is a flowchart showing an example of a process of conversion parameter calculation (step S3 in FIG. 2).

First, the converted pixel value calculation means 41 converts, based on the conversion parameter, the coordinates of the pixel location in the input image I corresponding to the selected pixel selected from the template image T, to interpolate the pixel value. By this process, the converted pixel value calculation means 41 calculates the pixel value I(W(X; p)) at the converted pixel location when converting the coordinates of the pixel in the input image corresponding to the selected pixel (step S21). The converted pixel value calculation means 41 performs this process for each pixel in the input image corresponding to the selected pixels selected from the template image T.

Next, the error calculation means 42 calculates an error between I(W(X; p)) calculated in step S21 and the pixel value $T_R(X)$ of the selected pixel selected from the template image T (step S22). That is, the error calculation means 42 calculates I(W(X; p))−$T_R(X)$, with regard to the corresponding I(W(X; p)) and $T_R(X)$.

After I(W(X: p))−$T_R(X)$ is calculated for each selected pixel, the parameter update calculation means 43 calculates Expression (8) below, using the calculation result in step S13 in the preprocessing (see FIG. 3) and the error calculated in step S22 (step S23).

$$\sum_x \left[ \nabla T_R \frac{\partial W}{\partial p} \right]^T [I(W(X; p)) - T_R(x)] \quad \text{Expression (8)}$$

In other words, the parameter update calculation means 43 performs, for each selected pixel, a process of multiplying the transposed matrix of the matrix (see Expression (6)) obtained as a result of step S13 by the error calculated in step S22, and calculates a total sum of the multiplication results.

The parameter update calculation means 43 then calculates the conversion parameter update Δp, using the calculation result in step S23 and the Hessian matrix (step S24). The conversion parameter update Δp can be represented by Expression (9) below.

$$\Delta p = H^{-1} \sum_x \left[ \nabla T_R \frac{\partial W}{\partial p} \right]^T [I(W(X; p)) - T_R(X)] \quad \text{Expression (9)}$$

That is, the parameter update calculation means 43 calculates Δp, by multiplying an inverse matrix of the Hessian matrix H obtained in step S14 in the preprocessing (see FIG. 3) by the calculation result of Expression (8).

After this, the parameter update means 44 updates the conversion parameter by composition of the conversion parameter with Δp, according to Expression (10) below (step S25).

$$W(X;p) \leftarrow W(X;p) \bigcirc W(X;\Delta p)^{-1} \quad \text{Expression (10)}$$

The following operator in the right side of Expression (10) is an operator representing composition of coordinate conversion. A coordinate conversion composition operation differs depending on a conversion model. The composition according to the conversion model may be performed in step S25.

Next, the condition determination means 45 determines whether or not the predetermined condition for ending the repeated conversion parameter update is satisfied (step S26). In Exemplary Embodiment 1, the condition determination means 45 determines whether or not Expression (11) below holds for Δp calculated in immediately preceding step S24 and, in the case where Expression (11) holds, determines that the predetermined condition is satisfied.

$$\|\Delta p\| \leq \epsilon \quad \text{E Expression (11)}$$

ε in the right side of Expression (11) is a predetermined threshold. Thus, Expression (11) indicates that the conversion parameter update Δp is smaller than a set reference value. In the case of determining that the condition is satisfied (step S26: Yes), the condition determination means 45 determines the conversion parameter calculated in immediately preceding step S25, as the conversion parameter for converting the input image to the template image (step S27).

In the case where Expression (11) does not hold (step S26: No), the condition determination means 45 determines that the predetermined condition is not satisfied. In this case, the parameter calculation means 4 repeats the process from step S21, using the conversion parameter updated in immediately preceding step S25.

The parameter calculation means 4 ends the process, as a result of determining the conversion parameter in step S27.

According to Exemplary Embodiment 1, the pixel selection means 2 randomly selects the pixels from the template image, and the parameter derivation means 6 performs processing for the selected pixels to derive the conversion parameter. Since the pixel selection means 2 randomly selects the pixels, the number of selected pixels can be limited to a fixed number or less, without depending on the size of the template image. Therefore, the processing cost of conversion parameter calculation can be kept within a fixed cost, even when the number of pixels of the template image changes.

Comparison between the present invention and the method described in PTL 1 reveals the following. In the method described in PTL 1, since spatially discrete pixels are selected, the number of selected pixels increases with an increase in the number of pixels of the template image, as a result of which the processing cost of conversion parameter calculation increases. On the other hand, in the present invention, since the pixel selection means 2 randomly selects pixels from the template image without depending on the number of pixels of the template image, the number of selected pixels can be limited to a fixed number without depending on the number of pixels of the template image. Thus, according to the present invention, the processing cost of conversion parameter calculation can be kept within a fixed cost, even when the number of pixels of the template image is large.

Moreover, in the present invention, since the pixel selection means 2 randomly selects pixels from the template image, it is possible to prevent the pixel values of the selected pixels from being biased even when there is periodicity in pixel value of the template image. This allows the conversion parameter to be calculated with high accuracy.

Exemplary Embodiment 2

Figure 5:
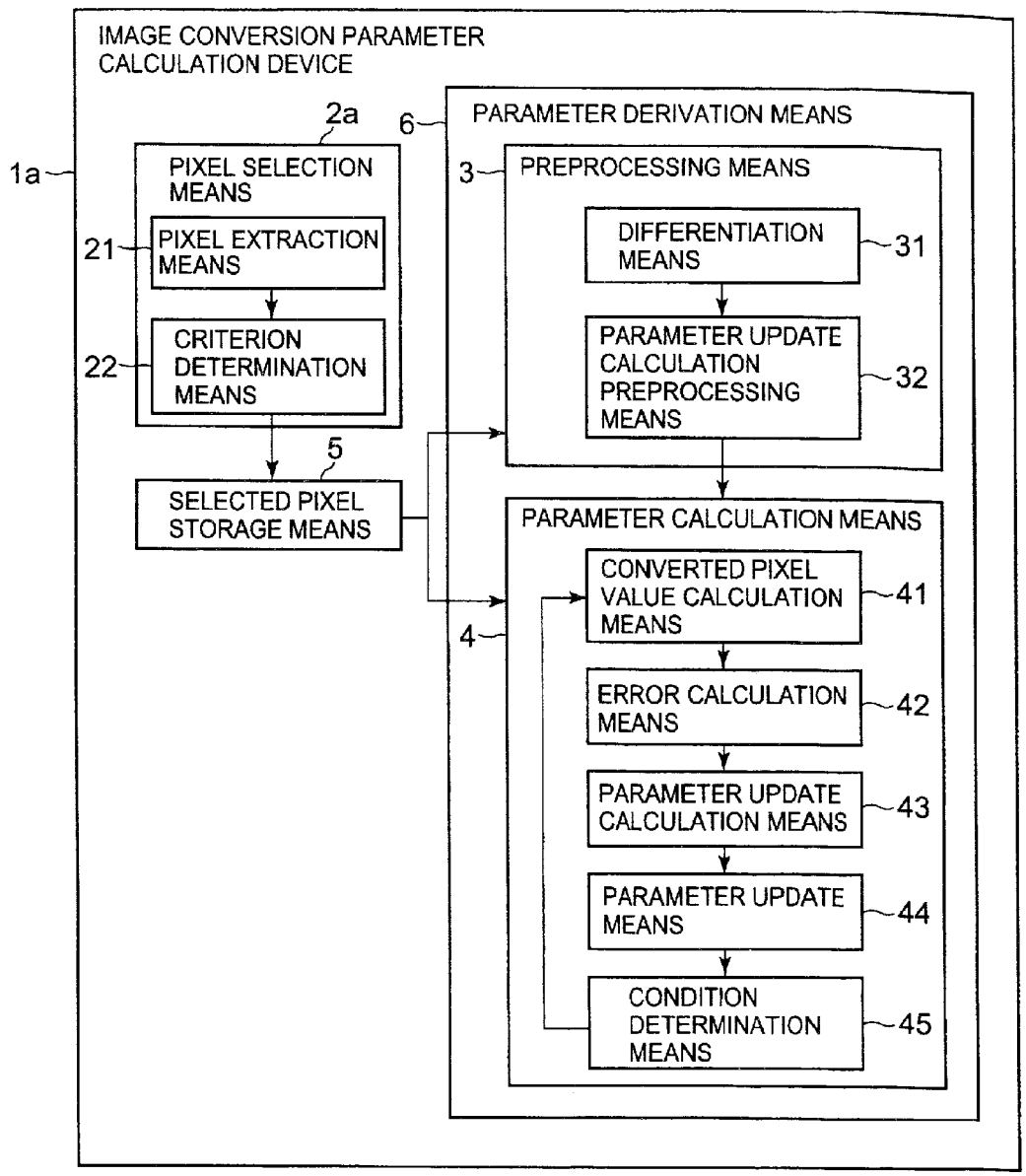
FIG. 5 It depicts a block diagram showing an example of an image conversion parameter calculation device in Exemplary Embodiment 2 of the present invention.

FIG. 5 is a block diagram showing an example of an image conversion parameter calculation device in Exemplary Embodiment 2 of the present invention. The same components as those in Exemplary Embodiment 1 are given the same reference signs as in FIG. 1, and their detailed description is omitted. An image conversion parameter calculation device 1a in Exemplary Embodiment 2 includes pixel selection means 2a, the selected pixel storage means 5, and the parameter derivation means 6. The selected pixel storage means 5 and the parameter derivation means 6 are the same as those in Exemplary Embodiment 1. In other words, the image conversion parameter calculation device 1a in Exemplary Embodiment 2 includes the pixel selection means 2a instead of the pixel selection means 2 in Exemplary Embodiment 1.

The pixel selection means 2a randomly extracts a pixel from the template image and, in the case where the pixel satisfies a predetermined criterion, selects the pixel as a pixel used for conversion parameter calculation. The pixel selection means 2a repeatedly performs this process to select the predetermined number of pixels used for conversion parameter calculation.

The pixel selection means 2a includes pixel extraction means 21 and criterion determination means 22.

The pixel extraction means 21 randomly extracts (takes out) a pixel from the template image. The extraction mentioned here means simply taking out a pixel, and is distinguished from selecting a pixel as a pixel used for conversion parameter calculation.

The criterion determination means 22 determines whether or not the pixel extracted by the pixel extraction means 21 satisfies a criterion, and in the case where the pixel satisfies the criterion, selects the pixel as a pixel used for conversion parameter calculation. An example of the criterion is a criterion that a partial derivative in the extracted pixel is not less than a predetermined threshold. The criterion used by the criterion determination means 22 is, however, not limited to this. For instance, a criterion that "the extracted pixel is not a pixel in a region containing noise in the template image" may be used.

The pixel selection means 2a (the pixel extraction means 21 and the criterion determination means 22) are realized, for example, by a CPU of a computer operating according to an image conversion parameter calculation program. In this case, the CPU may read the image conversion parameter calculation program and, according to the program, operate as the pixel extraction means 21 and the criterion determination means 22 included in the pixel selection means 2a and each means included in the parameter derivation means 6. Alternatively, each means shown in FIG. 5 may be realized by separate hardware.

The following describes operations in Exemplary Embodiment 2.

The image conversion parameter calculation device 1a in Exemplary Embodiment 2 executes processing in the sequence of the flowchart shown in FIG. 2. In detail, the pixel selection means 2a selects pixels from the template image (step S1). Next, the preprocessing means 3 performs the preprocessing (step S2). Following this, the parameter calculation means 4 determines the conversion parameter for converting the input image I to the template image T (step S3). Exemplary Embodiment 2, however, differs from Exemplary Embodiment 1 in the pixel selection process (step S1).

Figure 6:
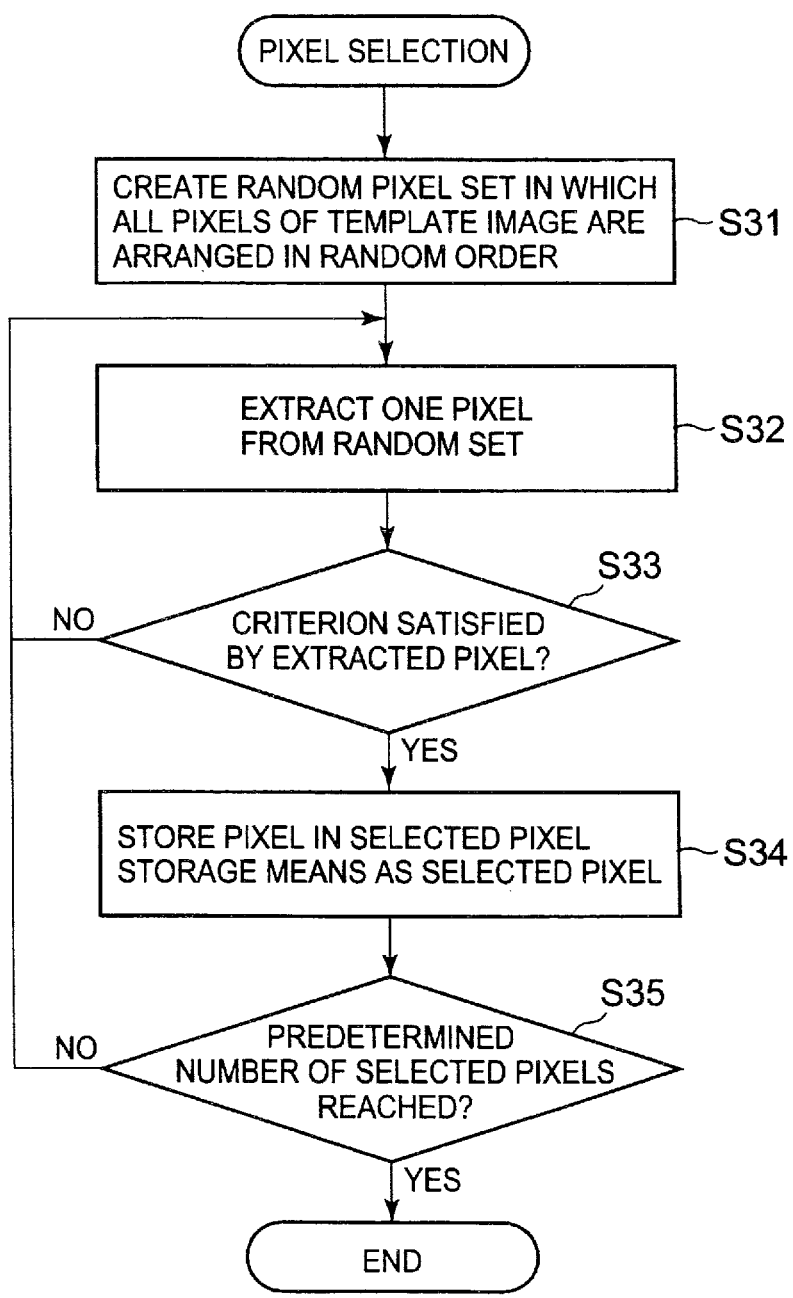
FIG. 6 It depicts is a flowchart showing an example of a process of pixel selection in Exemplary Embodiment 2.

FIG. 6 is a flowchart showing an example of a process of pixel selection (step S1) in Exemplary Embodiment 2. First, the pixel extraction means 21 creates a random pixel set in which all pixels of the template image are arranged in random order (step S31). This pixel set is hereafter referred to as a random set.

The pixel extraction means 21 then extracts one pixel from the random set (step S32).

Next, the criterion determination means 22 determines whether or not the pixel extracted in step S32 satisfies the predetermined criterion (step S33). As the criterion, a criterion that contributes to improved accuracy of the conversion parameter is set beforehand. An example where a criterion that a partial derivative in the extracted pixel with respect to the conversion parameter is not less than a predetermined threshold is set beforehand is used here. In this case, the criterion determination means 22 calculates the partial derivative in the pixel extracted in step S32 with respect to the conversion parameter, and determines whether or not the partial derivative is not less than the predetermined threshold. When the partial derivative is not less than the threshold, the criterion is satisfied. When the partial derivative is less than the threshold, the criterion is not satisfied.

In the case where the partial derivative in the extracted pixel is less than the threshold (step S33: No), the pixel selection means 2a repeats the process from step S32.

In the case where the partial derivative in the extracted pixel is not less than the threshold (step S33: Yes), the criterion determination means 22 selects the pixel extracted in step S32, as a pixel used for conversion parameter calculation. The criterion determination means 22 then stores the pixel location (coordinates) and the pixel value of the pixel, in the selected pixel storage means 5.

Following this, the criterion determination means 22 determines whether or not the number of pixels (selected pixels) each selected as a pixel used for conversion parameter calculation reaches the predetermined number (step S35). For example, the criterion determination means 22 may determine whether or not the number of pixels whose pixel locations and pixel values are stored in the selected pixel storage means 5 reaches the predetermined number.

When the number of selected pixels does not reach the predetermined number, the pixel selection means 2a repeats the process from step S32.

When the number of selected pixels reaches the predetermined number, on the other hand, the pixel selection means 2a ends the pixel selection (step S1, see FIG. 2). The subsequent preprocessing (step S2) and conversion parameter calculation (step S3) are the same as those in Exemplary Embodiment 1, and so their description is omitted.

In Exemplary Embodiment 2, the pixel selection means 2a selects pixels that are randomly extracted and satisfy the predetermined criterion. After this, the preprocessing means 3 and the parameter calculation means 4 perform processing for the pixels to calculate the conversion parameter. Hence, according to Exemplary Embodiment 2, not only the same advantageous effects as in Exemplary Embodiment 1 can be achieved, but also the accuracy of the conversion parameter can further be improved.

Moreover, in Exemplary Embodiment 2, after a pixel is randomly extracted from the template image, the criterion determination means 22 determines whether or not the pixel satisfies the criterion. This can prevent an increase in processing cost because the determination of whether or not the criterion is satisfied is not performed on all pixels of the template image.

Furthermore, in Exemplary Embodiment 2, regardless of how many selected pixels are desired, the desired number of pixels satisfying the criterion can be randomly selected. Comparison between the present invention and the method described in PTL 1 reveals the following. In the method described in PTL 1, too, pixels whose partial derivatives or levels of importance calculated from the partial derivatives are not less than a threshold are selected. In the method described in PTL 1, however, since spatially discrete pixels are selected, the number of selected pixels cannot be limited to the desired number. The number of selected pixels increases with an increase in the number of pixels of the template image, which results in an increase in processing cost. In the method described in PTL 1, it is conceivable to select discrete pixels and, at the time when the predetermined number of pixels whose partial derivatives are not less than the threshold are selected, complete the pixel selection. In this case, however, there is a problem that the selected pixels are concentrated in a specific region (e.g. an upper region) in the template image. On the other hand, in the present invention, the desired number of pixels can be randomly selected.

Though the above example describes the case where the partial derivative in the extracted pixel is calculated and compared with the threshold, the criterion determination means 22 may further calculate, from the calculated partial derivative, an index indicating favorability of the pixel, and compare the index with a threshold. The criterion determination means 22 may then determine that the criterion is satisfied when the index is not less than the threshold, and that the criterion is not satisfied when the index is less than the threshold. The "pixel favorability" mentioned here is the appropriateness of the pixel from a viewpoint that the accuracy of the conversion parameter can be improved. The partial derivative of the pixel is one example of this index.

The criterion determination means 22 may also convert this index (or the partial derivative itself) to a value in a range of 0 to 1, and determine whether or not the criterion is satisfied by comparing the converted value with a random number. In detail, the criterion determination means 22 may convert the index to a value in the range of 0 to 1, generate a random number in the range of 0 to 1, and determine that the criterion is satisfied when the converted index is not less than the random number and that the criterion is not satisfied when the converted index is less than the random number. By performing the determination process of step S33 in this way, it is possible to prevent a situation where a pixel with a small index is absolutely excluded from the selection, which contributes to improved robustness of random pixel selection.

The criterion determination means 22 may also use the criterion that "the extracted pixel is not a pixel in a region containing noise in the template image", as the determination criterion in step S33. In this case, the criterion determination means 22 may determine, in step S33, whether or not the pixel extracted by the pixel extraction means 21 is a pixel in a region containing noise (hereafter referred to as a noise region), and determine that the criterion is satisfied when the extracted pixel is not the pixel in the noise region (step S33: Yes) and that the criterion is not satisfied when the extracted pixel is the pixel in the noise region (step S33: No).

Here, an algorithm capable of determination by only performing processing for the extracted pixel is adopted as an algorithm for determining whether or not the extracted pixel is the pixel in the nose region. The use of such an algorithm enables the processing amount to be limited to a fixed amount without depending on the size of the template image. For example, the criterion determination means 22 may determine whether or not the extracted pixel is the pixel in the noise region, by a bilateral filter.

In the case of adopting the criterion that the extracted pixel is not the pixel in the noise region, the accuracy of the conversion parameter can be improved, too.

Exemplary Embodiment 3

Figure 7:
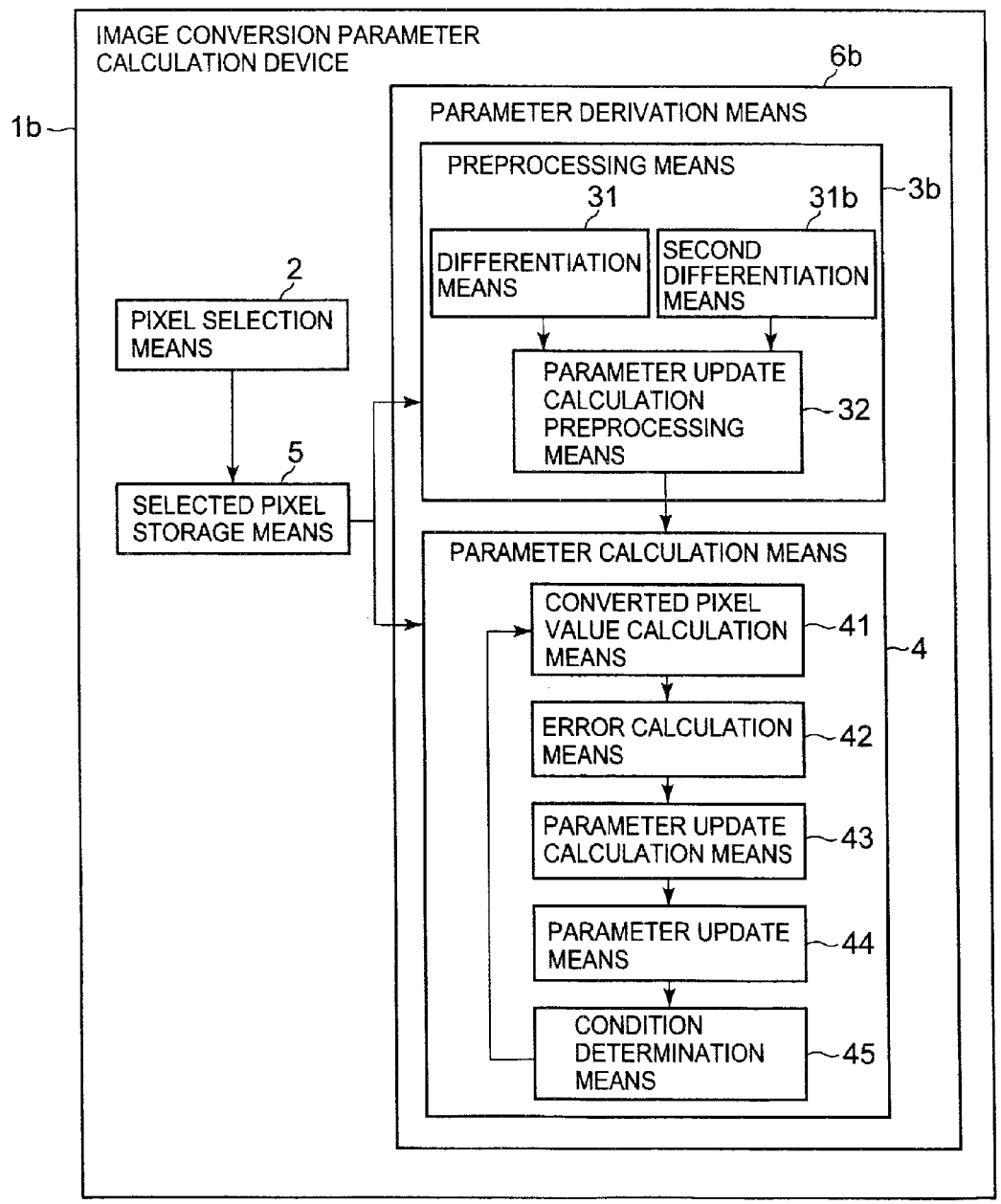
FIG. 7 It depicts a block diagram showing an example of an image conversion parameter calculation device in Exemplary Embodiment 3 of the present invention.

FIG. 7 is a block diagram showing an example of an image conversion parameter calculation device in Exemplary Embodiment 3 of the present invention. The same components as those in Exemplary Embodiment 1 are given the same reference signs as in FIG. 1, and their detailed description is omitted. An image conversion parameter calculation device 1b in Exemplary Embodiment 3 includes the pixel selection means 2, the selected pixel storage means 5, and parameter derivation means 6b. The pixel selection means 2 and the selected pixel storage means 5 are the same as those in Exemplary Embodiment 1.

In Exemplary Embodiment 3, the parameter derivation means 6b performs the preprocessing and the parameter calculation once, and then performs the preprocessing and the parameter calculation again. In the first preprocessing, the parameter derivation means 6b calculates $\nabla T_R$ obscurely, as compared with the second preprocessing. In the parameter calculation after the second preprocessing, the parameter derivation means 6b calculates the conversion parameter using the conversion parameter obtained as a result of the parameter calculation after the first preprocessing.

The parameter derivation means 6b includes preprocessing means 3b for executing the preprocessing, and the parameter calculation means 4 for calculating the conversion parameter using the preprocessing result. A process in which the preprocessing means 3b performs the preprocessing and the parameter calculation means 4 performs the parameter calculation is performed twice.

The preprocessing means 3b includes the differentiation means 31, second differentiation means 31b, and the parameter update calculation preprocessing means 32.

The differentiation means 31 is the same as the differentiation means 31 in Exemplary Embodiments 1 and 2, and calculates the derivative $\nabla T_R$ in the selected pixel. The differentiation means 31, however, calculates $\nabla T_R$ in the second preprocessing. The second differentiation means 31b equally calculates the derivative $\nabla T_R$ in the selected pixel. The second differentiation means 31b, however, calculates $\nabla T_R$ in the first preprocessing.

When calculating $\nabla T_R$ in the first preprocessing, the second differentiation means 31b calculates $\nabla T_R$ obscurely, as compared with the calculation of $\nabla T_R$ by the differentiation means 31 in the second preprocessing. In detail, the second differentiation means 31b calculates $\nabla T_R$ using not only the pixels adjacent to the selected pixels but also the neighboring pixels. In the second preprocessing, the differentiation means 31 calculates $\nabla T_R$ using the pixel values of the pixels adjacent to the selected pixel, as in Exemplary Embodiment 1. That is, in the first preprocessing, the second differentiation means 31b calculates $\nabla T_R$ using a wider range of pixels than the calculation of $\nabla T_R$ by the differentiation means 31 in the second preprocessing.

The parameter update calculation preprocessing means 32 is the same as the parameter update calculation preprocessing means 32 in Exemplary Embodiment 1, and performs the preprocessing of the conversion parameter update calculation using $\nabla T_R$. In the first preprocessing, the parameter update calculation preprocessing means 32 performs the preprocessing of the conversion parameter update calculation using $\nabla T_R$ calculated by the second differentiation means 31b. In the second preprocessing, the parameter update calculation preprocessing means 32 performs the preprocessing of the conversion parameter update calculation using $\nabla T_R$ calculated by the differentiation means 31.

The parameter calculation means 4 includes the converted pixel value calculation means 41, the error calculation means 42, the parameter update calculation means 43, the parameter update means 44, and the condition determination means 45. The converted pixel value calculation means 41, the error calculation means 42, the parameter update calculation means 43, the parameter update means 44, and the condition determination means 45 respectively perform the same processes as the converted pixel value calculation means 41, the error calculation means 42, the parameter update calculation means 43, the parameter update means 44, and the condition determination means 45 in Exemplary Embodiment 1. The parameter calculation means 4, however, performs the parameter calculation after each of the first preprocessing and the second preprocessing.

The parameter derivation means 6b including the preprocessing means 3b (the differentiation means 31, the second differentiation means 31b, and the parameter update calculation preprocessing means 32) and the parameter calculation means 4 (the converted pixel value calculation means 41, the error calculation means 42, the parameter update calculation means 43, the parameter update means 44, and the condition determination means 45) and the pixel selection means 2 are realized, for example, by a CPU of a computer operating according to an image conversion parameter calculation program. In this case, the image conversion parameter calculation program may be stored in a program storage device (not shown) of the computer, with the CPU reading the program and, according to the program, operating as the pixel selection means 2 and each means included in the parameter derivation means 6b. Alternatively, each means shown in FIG. 7 may be realized by separate hardware.

The following describes operations.

Figure 8:
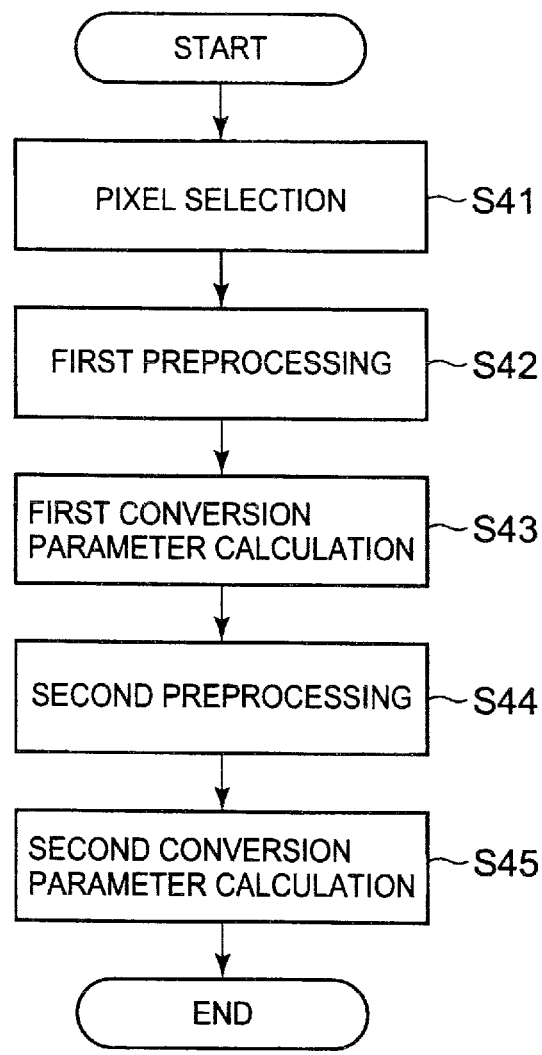
FIG. 8 It depicts a flowchart showing an example of processes in Exemplary Embodiment 3.

FIG. 8 is a flowchart showing an example of processes in Exemplary Embodiment 3. First, the pixel selection means 2 randomly selects the predetermined number of pixels from the template image (step S41). The pixel selection in step S41 is the same as that in step S1 in Exemplary Embodiment 1.

Next, the preprocessing means 3b performs the first preprocessing (step S42). The first preprocessing (step S42) is described below, with reference to the flowchart shown in FIG. 3.

In the first preprocessing (step S42), first the second differentiation means 31b calculates the derivative $\nabla T_R$ in each selected pixel selected from the template image (step S11). In detail, the second differentiation means 31b calculates $\nabla T_{Rx}$ (x, y) in the x direction and $\nabla T_{Ry}$(x, y) in the y direction. This is the same as in Exemplary Embodiment 1. Note, however, that the second differentiation means 31b calculates $\nabla T_R$ obscurely in the first preprocessing, as compared with the calculation of $\nabla T_R$ by the differentiation means 31 in the second preprocessing.

FIGS. 9A-9D are an explanatory diagram showing examples of a filter used for calculating $\nabla T_R$ in the first preprocessing. The second differentiation means 31b may calculate $\nabla T_{Rx}$(x, y) by, for example, executing convolution on the selected pixel using a filter shown in FIG. 9A. Thus, $\nabla T_{Rx}$(x, y) can be calculated using, for example, a filter in which each element of one central column is 0, each element to the right side of the central column is 1, and each element to the left side of the central column is −1 (see FIG. 9A). The convolution using the filter shown in FIG. 9A corresponds to the convolution using two filters shown in FIG. 9B.

Likewise, the second differentiation means 31b may calculate $\nabla T_{Ry}$(x, y) by, for example, executing convolution on the selected pixel using a filter shown in FIG. 9C. Thus, $\nabla T_{Ry}$(x, y) can be calculated using, for example, a filter in which each element of one central row is 0, each element above the central row is −1, and each element below the central row is 1 (see FIG. 9C). The convolution using the filter shown in FIG. 9C corresponds to the convolution using two filters shown in FIG. 9D.

The filters shown in FIGS. 9A and 9C are merely examples of the filter used for calculating $\nabla T_R$ in the first preprocessing, and the second differentiation means 31b may use other filters.

After $\nabla T_R$ is calculated, the parameter update calculation preprocessing means 32 calculates, for each selected pixel, a Jacobian matrix with respect to the conversion W(X; p) (step S12). The parameter update calculation preprocessing means 32 then calculates, for each selected pixel, a product of $\nabla T_R$ calculated in step S11 and the Jacobian matrix calculated in step S12 (step S13). After this, the parameter update calculation preprocessing means 32 calculates a Hessian matrix H (step S14). The process in steps S12 to S14 is the same as that in Exemplary Embodiment 1.

Next, the parameter calculation means 4 performs the first parameter calculation (step S43). The first parameter calculation is described below, with reference to the flowchart shown in FIG. 4.

First, the converted pixel value calculation means 41 converts, based on the conversion parameter, the coordinates of the pixel location in the input image I corresponding to the selected pixel selected from the template image T, to interpolate the pixel value. By this process, the converted pixel value calculation means 41 calculates I(W(X; p)) (step S21). Next, the error calculation means 42 calculates an error between I(W(X; p)) calculated in step S21 and the pixel value $T_R$(X) of the selected pixel (step S22). Following this, the parameter update calculation means 43 calculates Expression (8), using the calculation result in step S13 in the first preprocessing and the error calculated in step S22 (step S23). The parameter update calculation means 43 then calculates the conversion parameter update Δp, using the calculation result in step S23 and the Hessian matrix (step S24). After this, the parameter update means 44 updates the conversion parameter by composition of the conversion parameter with Δp, according to Expression (10) (step S25). The process in steps S21 to S25 is the same as that in Exemplary Embodiment 1.

After step S25, the condition determination means 45 determines whether or not the predetermined condition for ending the repeated conversion parameter update is satisfied (step S26). This determination may be performed in the same way as in Exemplary Embodiment 1. When the predetermined condition is not satisfied (step S26: No), the parameter calculation means 4 repeats the process from step S21, using the updated conversion parameter. When the predetermined condition is satisfied (step S26: Yes), the condition determination means 45 determines the conversion parameter calculated in immediately preceding step S25, as the result of the first conversion parameter calculation (step S27). As a result of the above-mentioned processing, the parameter calculation means 4 ends the first parameter calculation (step S43).

Next, the preprocessing means 3b performs the second preprocessing (step S44). The second preprocessing (step S44) is described below, with reference to the flowchart shown in FIG. 3.

In the second preprocessing (step S44), first the differentiation means 31 calculates the derivative $\nabla T_R$ in each selected pixel selected from the template image (step S11). In the second preprocessing, the differentiation means 31 calculates $\nabla T_R$ in the same way as in Exemplary Embodiment 1, without obscuring $\nabla T_R$. That is, the differentiation means 31 calculates $\nabla T_{Rx}(x, y)$ and $\nabla T_{Ry}(x, y)$ using the pixel values of the pixels adjacent to the selected pixel, according to Expressions (3) and (4).

After $\nabla T_R$ is calculated, the parameter update calculation preprocessing means 32 performs steps S12 to S14, as in the first preprocessing. The parameter update calculation preprocessing means 32, however, performs steps S12 to S14 using $\nabla T_R$ calculated by the differentiation means 31. The first preprocessing (step S42) and the second preprocessing (step S44) are the same process, except that the calculation of $\nabla T_R$ by the differentiation means 31 and the calculation of $\nabla T_R$ by the second differentiation means 31b are different. Since $\nabla T_R$ is different, however, different results are obtained in the first preprocessing and the second preprocessing.

Next, the parameter calculation means 4 performs the second parameter calculation (step S45). In the second parameter calculation, the parameter calculation means 4 executes the loop of steps S21 to S26 shown in FIG. 4, using the conversion parameter obtained in the first parameter calculation (step S43) as an initial value. When the predetermined condition is satisfied in step S26 (step S26: Yes), the condition determination means 45 determines the conversion parameter calculated in immediately preceding step S25, as the result of the second conversion parameter calculation (step S27). The process in steps S21 to S27 is the same as that in the first parameter calculation (step S43).

The conversion parameter determined in step S27 executed in the second parameter calculation (step S45) is the eventually obtained conversion parameter.

According to Exemplary Embodiment 3, $\nabla T_R$ is calculated obscurely in the first preprocessing (step S42). As a result, in the loop (see steps S21 to S26 in FIG. 4) in the subsequent parameter calculation (step S43), the conversion parameter update per loop operation can be kept from being small in amount. Besides, it is possible to prevent a situation where a local solution is yielded and so the conversion parameter as a true solution cannot be obtained. In the second preprocessing (step S44), $\nabla T_R$ is calculated without obscuring it, so that the conversion parameter can be calculated more finely based on the conversion parameter calculated in step S43. This enables the conversion parameter as the solution to be stably calculated, even in the case where there is a significant variation between the template image and the input image or in the case where the number of selected pixels is small. In addition, the conversion parameter can be obtained at high speed.

In Exemplary Embodiment 3, the degree of freedom of the parameter of the conversion model may be set lower in the first preprocessing than in the second preprocessing. For example, the first preprocessing and the second preprocessing may be performed by respectively applying a translation of two degrees of parameter freedom and applying an affine transformation of six degrees of parameter freedom as the conversion W(X; p). The conversion model application is not limited to this example. As another example, the first preprocessing and the second preprocessing may be performed by respectively applying a translation and applying a homography transformation.

In this case, the converted pixel value calculation means 41, the error calculation means 42, the parameter update calculation means 43, and the parameter update means 44 perform the parameter calculation after the first preprocessing using W(X; p) applying the same conversion model as in the first preprocessing, and perform the parameter calculation after the second preprocessing using W(X; p) applying the same conversion model as in the second preprocessing.

Exemplary Embodiment 4

Figure 10:
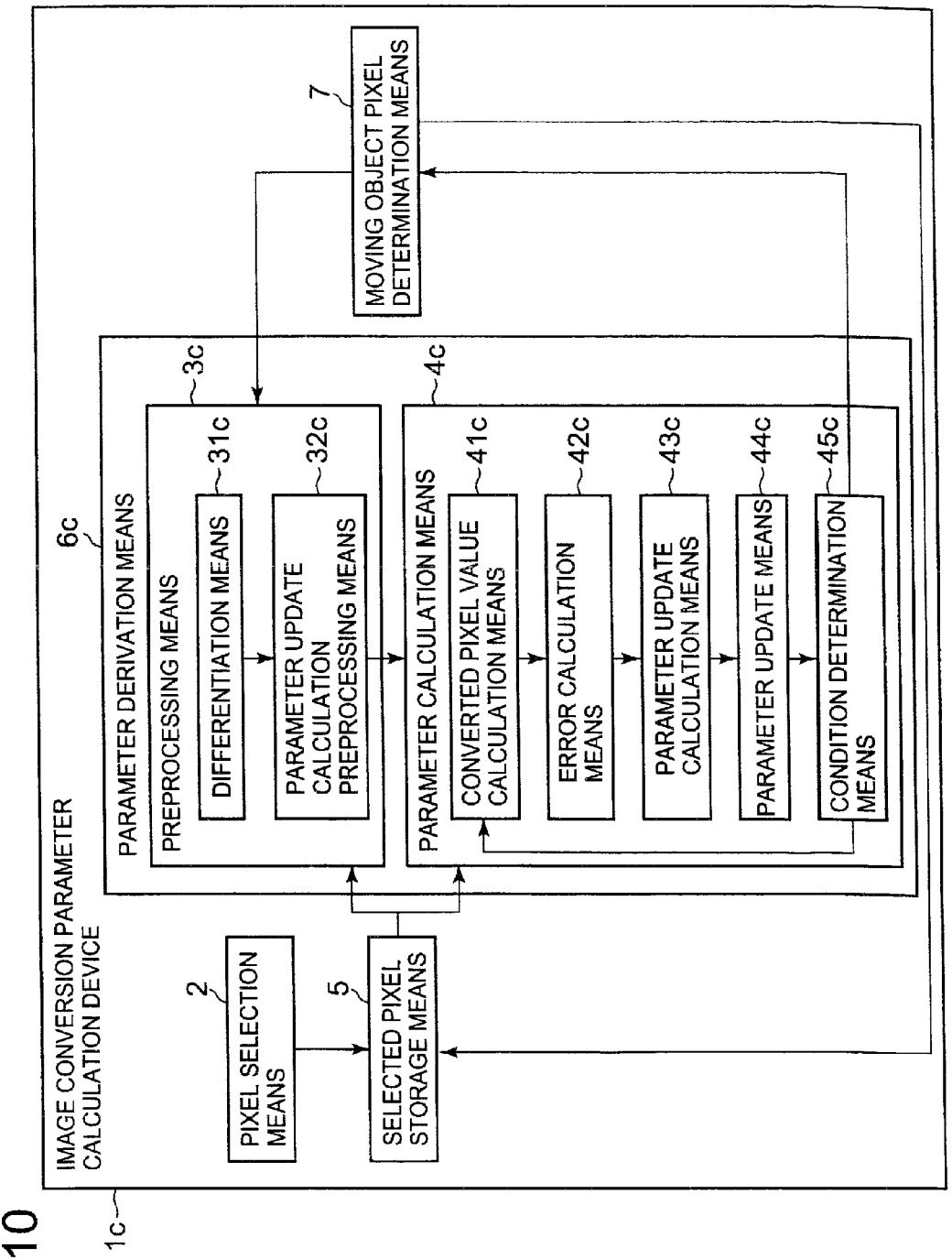
FIG. 10 It depicts a block diagram showing an example of an image conversion parameter calculation device in Exemplary Embodiment 4 of the present invention.

FIG. 10 is a block diagram showing an example of an image conversion parameter calculation device in Exemplary Embodiment 4 of the present invention. The same components as those in Exemplary Embodiment 1 are given the same reference signs as in FIG. 1, and their detailed description is omitted. An image conversion parameter calculation device 1c in Exemplary Embodiment 4 includes the pixel selection means 2, the selected pixel storage means 5, parameter derivation means 6c, and moving object pixel determination means 7. The pixel selection means 2 and the selected pixel storage means 5 are the same as those in Exemplary Embodiment 1.

In Exemplary Embodiment 4, the parameter derivation means 6c repeatedly performs the preprocessing and the parameter calculation. After the preprocessing and the parameter calculation are performed, the moving object pixel determination means 7 removes, from the selected pixels, each pixel in a region (moving object region) corresponding to an object having motion (hereafter referred to as a moving object) between the images. The use of a pixel in a moving object region when calculating the conversion parameter causes a decrease in accuracy of the conversion parameter. In Exemplary Embodiment 4, such a pixel is removed from the selected pixels by the moving object pixel determination means 7, and then the preprocessing and the parameter calculation are performed again, to thereby derive the conversion parameter with high accuracy.

Here, in the case of repeatedly performing the preprocessing and the parameter calculation, the parameter derivation means 6c partially changes the preprocessing and the parameter calculation depending on the number of times the preprocessing and the parameter calculation have been performed so far. The following describes an example where the preprocessing and the parameter calculation are performed three times.

The parameter derivation means 6c includes preprocessing means 3c for executing the preprocessing, and parameter calculation means 4c for calculating the conversion parameter using the preprocessing result. After the parameter calculation means 4c calculates the conversion parameter, the moving object pixel determination means 7 determines the pixel in the moving object region based on the conversion parameter, and removes the pixel from the selected pixels. Subsequently, the preprocessing means 3c and the parameter calculation means 4c execute the respective processes again.

The preprocessing means 3c includes differentiation means 31c and parameter update calculation preprocessing means 32c.

The differentiation means 31c calculates the derivative $\nabla T_R$ in the selected pixel. The parameter update calculation preprocessing means 32c performs the preprocessing of the conversion parameter update calculation using $\nabla T_R$ calculated by the differentiation means 31c. Though the processes performed by the differentiation means 31c and the parameter update calculation preprocessing means 32c are respectively the same as the processes performed by the differentiation means 31 and the parameter update calculation preprocessing means 32 in Exemplary Embodiment 1, Exemplary Embodiment 4 differs from Exemplary Embodiment 1 in that the preprocessing means 3c executes the preprocessing a plurality of times.

The parameter calculation means 4c includes converted pixel value calculation means 41c, error calculation means 42c, parameter update calculation means 43c, parameter update means 44c, and condition determination means 45c. The converted pixel value calculation means 41c, the error calculation means 42c, the parameter update calculation means 43c, the parameter update means 44c, and the condition determination means 45c respectively perform the same processes as the converted pixel value calculation means 41, the error calculation means 42, the parameter update calculation means 43, the parameter update means 44, and the condition determination means 45 in Exemplary Embodiment 1. The parameter calculation means 4c, however, performs the parameter calculation each time the preprocessing is performed. Moreover, in the first to third parameter calculation each performed after the preprocessing, the condition determination means 45c performs the condition determination using a stricter condition for ending the loop of steps S21 to S26 (see FIG. 4) as the number of times the parameter calculation has been performed increases. This condition can be regarded as a conversion parameter convergence determination condition.

The moving object pixel determination means 7 determines, after the first preprocessing and parameter calculation, the pixel in the moving object region from among the selected pixels based on the conversion parameter, and removes the pixel from the selected pixels. The moving object pixel determination means 7 equally determines, after the second preprocessing and parameter calculation, the pixel in the moving object region from among the selected pixels based on the conversion parameter, and further removes the pixel from the selected pixels.

The parameter derivation means 6c including the preprocessing means 3c (the differentiation means 31c and the parameter update calculation preprocessing means 32c) and the parameter calculation means 4c (the converted pixel value calculation means 41c, the error calculation means 42c, the parameter update calculation means 43c, the parameter update means 44c, and the condition determination means 45c), the pixel selection means 2, and the moving object pixel determination means 7 are realized, for example, by a CPU of a computer operating according to an image conversion parameter calculation program. In this case, the image conversion parameter calculation program may be stored in a program storage device (not shown) of the computer, with the CPU reading the program and, according to the program, operating as the pixel selection means 2, the moving object pixel determination means 7, and each means included in the parameter derivation means 6c. Alternatively, each means shown in FIG. 10 may be realized by separate hardware.

The following describes operations.

Figure 11:
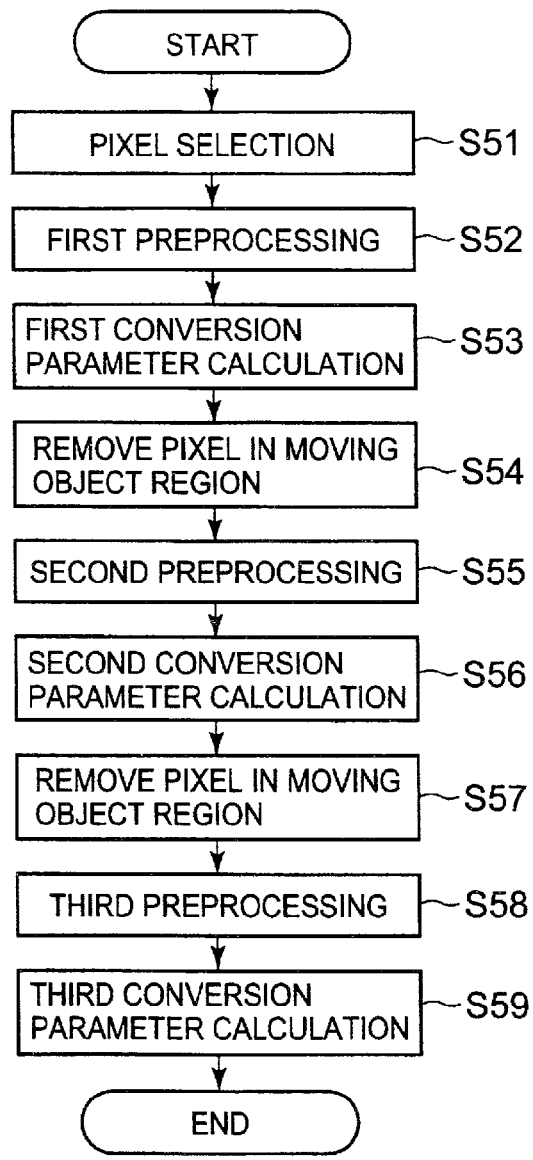
FIG. 11 It depicts a flowchart showing an example of processes in Exemplary Embodiment 4.

FIG. 11 is a flowchart showing an example of processes in Exemplary Embodiment 4. First, the pixel selection means 2 randomly selects the predetermined number of pixels from the template image (step S51). The pixel selection in step S51 is the same as that in step S1 in Exemplary Embodiment 1.

Next, the preprocessing means 3c performs the first preprocessing (step S52). The first preprocessing (step S52) is described below, with reference to the flowchart shown in FIG. 3.

In the first preprocessing (step S52), first the differentiation means 31c calculates the derivative $\nabla T_R$ in each selected pixel selected from the template image (step S11). In detail, the differentiation means 31c calculates $\nabla T_{Rx}(x, y)$ in the x direction and $\nabla T_{Ry}(x, y)$ in the y direction. This calculation is the same as the calculation of $\nabla T_R$ in Exemplary Embodiment 1. That is, $\nabla T_{Rx}(x, y)$ and $\nabla T_{Ry}(x, y)$ may be calculated according to Expressions (3) and (4).

After $\nabla T_R$ is calculated, the parameter update calculation preprocessing means 32c calculates, for each selected pixel, a Jacobian matrix with respect to the conversion W(X; p) (step S12). The parameter update calculation preprocessing means 32c then calculates, for each selected pixel, a product of $\nabla T_R$ calculated in step S11 and the Jacobian matrix calculated in step S12 (step S13). After this, the parameter update calculation preprocessing means 32c calculates a Hessian matrix H (step S14). The process in steps S12 to S14 is the same as that in Exemplary Embodiment 1.

Next, the parameter calculation means 4c performs the first parameter calculation (step S53). The first parameter calculation is described below, with reference to the flowchart shown in FIG. 4.

First, the converted pixel value calculation means 41c converts, based on the conversion parameter, the coordinates of the pixel location in the input image I corresponding to the selected pixel selected from the template image T, to interpolate the pixel value. By this process, the converted pixel value calculation means 41c calculates I(W(X; p)) (step S21). Next, the error calculation means 42c calculates an error between I(W(X; p)) calculated in step S21 and the pixel value $T_R(X)$ of the selected pixel (step S22). Following this, the parameter update calculation means 43c calculates Expression (8), using the calculation result in step S13 in the first preprocessing and the error calculated in step 22 (step S23). The parameter update calculation means 43c then calculates the conversion parameter update $\Delta p$, using the calculation result in step S23 and the Hessian matrix (step S24). After this, the parameter update means 44c updates the conversion parameter by composition of the conversion parameter with $\Delta p$, according to Expression (10) (step S25). The process in steps S21 to S25 is the same as that in Exemplary Embodiment 1.

After step S25, the condition determination means 45c determines whether or not the predetermined condition for ending the repeated conversion parameter update is satisfied (step S26). An example where it is determined that the predetermined condition is satisfied when Expression (11) holds is used here, for simplicity's sake. The value of the threshold $\epsilon$ in the right side of Expression (11) is largest in the first parameter calculation (step S53), and decreases in the order of the second parameter calculation (step S56) and the third parameter calculation (step S59). That is, the condition for ending the loop of steps S21 to S26 is stricter in later parameter calculation. Though the case of using Expression (11) in the end determination is used as an example here, the same applies to the case of using other end conditions.

When Expression (11) does not hold (step S26: No), the parameter calculation means 4c repeats the process from step S21, using the updated conversion parameter.

When Expression (11) holds (step S26: Yes), the condition determination means 45c determines the conversion parameter calculated in immediately preceding step S25, as the result of the first conversion parameter calculation. As a result of the above-mentioned processing, the parameter calculation means 4c ends the first parameter calculation (step S53).

Next, the moving object pixel determination means 7 determines the pixel in the moving object region from among the selected pixels using the conversion parameter calculated in step S53, and removes the pixel from the selected pixels (step S54).

For example, the moving object pixel determination means 7 may determine the pixel corresponding to the moving object region in the following manner. The moving object pixel determination means 7 calculates an error in pixel value between the pixel in the input image to be converted to the selected pixel in the template image by the conversion parameter calculated in step S53 and the converted pixel. The moving object pixel determination means 7 determines that the selected pixel is the pixel in the moving object region when the error is not less than a predetermined threshold, and determines that the selected pixel is not the pixel in the moving object region when the error is less than the threshold. The method for determining whether or not the selected pixel is the pixel in the moving object region is not limited to this method, and the moving object pixel determination means 7 may use other methods.

Moreover, the moving object pixel determination means 7 may remove the selected pixel determined as the pixel in the moving object region, by deleting information of the selected pixel from the selected pixel storage means 5.

After step S54, the preprocessing means 31c performs the preprocessing for the selected pixels remaining without being removed (step S55). This preprocessing corresponds to the second preprocessing.

In the second preprocessing (step S55), the preprocessing means 31c may perform the same process as in the first preprocessing (step S52), on the selected pixels remaining without being removed. However, the process of steps S11 to S13 (see FIG. 3) on the selected pixels remaining without being removed is the same process as steps S11 to S13 in the first preprocessing (step S52), and so produces the same processing result. Accordingly, in the second preprocessing, the result of steps S11 to S13 in the first preprocessing (step S52) may be used while omitting the process of steps S11 to S13. Here, only the calculation result of the Hessian matrix H is different from that in the first preprocessing, because the number of selected pixels is smaller. Therefore, the parameter update calculation preprocessing means 32c executes the calculation of the Hessian matrix H (step S14) without omitting it in step S55. The parameter update calculation preprocessing means 32c may calculate the Hessian matrix H according to Expression (7).

Next, the parameter calculation means 4c performs the second parameter calculation (step S56). The second parameter calculation (step S56) is the same as that in step S53, except that the threshold $\epsilon$ in the right side of Expression (11) used for the determination in step S26 is smaller than in the first parameter calculation (step S53).

Next, the moving object pixel determination means 7 determines the pixel in the moving object region from among the selected pixels using the conversion parameter calculated in step S56, and removes the pixel from the selected pixels (step S57). This process is the same as that in step S54.

After step S57, the preprocessing means 31c performs the preprocessing for the selected pixels remaining without being removed (step S58). This preprocessing corresponds to the third preprocessing.

In the third preprocessing (step S58), the preprocessing means 31c may perform the same process as in the first preprocessing (step S52), on the selected pixels remaining without being removed. However, the process of steps S11 to S13 (see FIG. 3) on the selected pixels remaining without being removed is the same process as steps S11 to S13 in the first preprocessing (step S52), and so produces the same processing result, as mentioned earlier. Accordingly, in the third preprocessing as in the second preprocessing, the result of steps S11 to S13 in the first preprocessing (step S52) may be used while omitting the process of steps S11 to S13. Here, only the calculation result of the Hessian matrix H is different from that in the first and second preprocessing, because the number of selected pixels is smaller. Therefore, the parameter update calculation preprocessing means 32c executes the calculation of the Hessian matrix H (step S14) without omitting it in step S58. The parameter update calculation preprocessing means 32c may calculate the Hessian matrix H according to Expression (7).

Next, the parameter calculation means 4c performs the third parameter calculation (step S59). The third parameter calculation (step S59) is the same as that in step S56, except that the threshold $\epsilon$ in the right side of Expression (11) used for the determination in step S26 is smaller than in the second parameter calculation (step S56).

The condition determination means 45c determines the conversion parameter obtained in step S59, as the parameter for converting the input image to the template image.

According to Exemplary Embodiment 4, the moving object pixel determination means 7 determines the pixel belonging to the moving object region from among the selected pixels using the conversion parameter calculated by the parameter calculation means 4c, and removes the pixel from the selected pixels. The preprocessing means 3c and the parameter calculation means 4c perform processing for the selected pixels remaining without being removed (i.e. the selected pixels other than in the moving object region), to calculate the conversion parameter. In this way, the conversion parameter can be calculated with high accuracy, without being influenced by the object having motion between the input image and the template image.

Here, steps S57 to S59 may be omitted so that the conversion parameter obtained in step S56 is determined as the parameter for converting the input image to the template image.

Moreover, in the case where the number of selected pixels removed is not more than a predetermined threshold in step S54, the parameter derivation means 6c may determine that no moving object is present, and determine the conversion parameter obtained in step S53 as the parameter for converting the input image to the template image without performing the subsequent processing. Likewise, in the case where the number of selected pixels removed is not more than a predetermined threshold in step S57, too, the parameter derivation means 6c may determine that no moving object is present, and determine the conversion parameter obtained in step S56 as the parameter for converting the input image to the template image without performing the subsequent processing.

Alternatively, the same process as in steps S57 to S59 may be repeated after step S59. The number of times the process is performed is not particularly limited. However, since the conversion parameter of high accuracy can be obtained by the time the third conversion parameter calculation (step S59) is completed, it is preferable to end the process in step S59 in order to prevent an increase in processing amount.

The above describes the case where the preprocessing means 3c executes steps S11 to S14 (see FIG. 3) in the first preprocessing (step S52, see FIG. 11) and executes the calculation of the Hessian matrix H (step S14) while omitting steps S11 to S13 in the second and subsequent preprocessing. Here, in the second and subsequent preprocessing (steps S55 and S58), steps S11 to S13 are omitted by using the result of steps S11 to S13 in the first preprocessing. Exemplary Embodiment 4 may be modified to such a structure in which the preprocessing means 3c also omits the calculation of the Hessian matrix H (step S14) in the second and subsequent preprocessing (steps S55 and S58), and the parameter calculation means 4c performs the second and subsequent parameter calculation (steps S56 and S59) using the Hessian matrix H calculated in the first preprocessing. That is, the parameter update calculation preprocessing means 32c may omit the calculation of the Hessian matrix H in the second and subsequent preprocessing (steps S55 and S58). Note that, in the first preprocessing, the preprocessing means 3c executes steps S11 to S14 including the calculation of the Hessian matrix H, without omitting any of the steps. By omitting the calculation of the Hessian matrix in the second and subsequent preprocessing, too, the processing amount of preprocessing can be reduced.

In the case where the parameter calculation means 4c performs the second and subsequent parameter calculation (steps S56 and S59) using the Hessian matrix H calculated in the first preprocessing, the Hessian matrix H calculated in the first preprocessing is used as an approximate value of the Hessian matrix. In order to enhance the accuracy of the conversion parameter calculated, a structure in which the parameter update calculation preprocessing means 32c executes the calculation of the Hessian matrix H without omitting it may be adopted, instead of using the approximate value of the Hessian matrix in the second and subsequent parameter calculation (steps S56 and S59).

In order to reduce the processing amount of preprocessing, on the other hand, a structure in which the calculation of the Hessian matrix is omitted as with steps S11 to S13 in the second and subsequent preprocessing (steps S55 and S58) may be adopted.

Moreover, Exemplary Embodiment 3 may be applied to Exemplary Embodiment 4. That is, $\nabla T_R$ may be calculated obscurely in the first preprocessing (step S52), as compared with the second and subsequent preprocessing (steps S55 and S58).

In the case of applying Exemplary Embodiment 3 to Exemplary Embodiment 4, the degree of freedom of the parameter of the conversion model may be set lower in the first preprocessing than in the second and subsequent preprocessing. For example, the first preprocessing and the second and subsequent preprocessing may be performed by respectively applying a translation of two degrees of parameter freedom and applying an affine transformation of six degrees of parameter freedom as the conversion W(X; p). The conversion model application is not limited to this example. As another example, the first preprocessing and the second and subsequent preprocessing may be performed by respectively applying a translation and applying a homography transformation. In this case, the converted pixel value calculation means 41c, the error calculation means 42c, the parameter update calculation means 43c, and the parameter update means 44c perform the parameter calculation (step S53) after the first preprocessing using W(X; p) applying the same conversion model as in the first preprocessing, and perform the parameter calculation (steps S56 and S59) after the second and subsequent preprocessing using W(X; p) applying the same conversion model as in the second and subsequent preprocessing (steps S55 and S58).

In the case of applying Exemplary Embodiment 3 to Exemplary Embodiment 4, $\nabla T_R$ is different between the first preprocessing and the second and subsequent preprocessing. Hence, the preprocessing means 3c performs all of steps S11 to S14 in the second preprocessing (step S55). In the third preprocessing, the preprocessing means 3c may omit the process of steps S11 to S13 and use the result of steps S11 to S13 in the second preprocessing (step S55). The preprocessing means 3c, however, performs the calculation of the Hessian matrix (step S14), as mentioned above.

In each of Exemplary Embodiments 3 and 4, the image conversion parameter calculation device 1b or 1c may include the pixel selection means 2a (see FIG. 5) instead of the pixel selection means 2 (see FIGS. 7 and 10) and randomly select pixels by the same method as in Exemplary Embodiment 2.

In each of the exemplary embodiments described above, the image conversion parameter calculation device may convert the input image using the conversion parameter, after calculating the conversion parameter.

Figure 12:
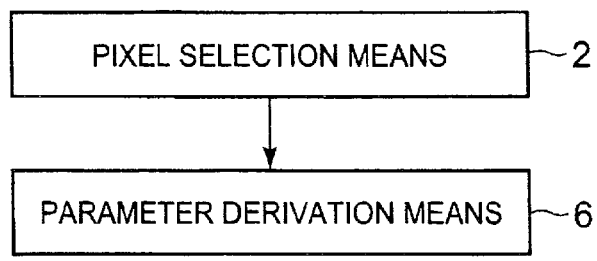
FIG. 12 It depicts a block diagram showing an example of a minimum structure according to the present invention.

The following describes an example of a minimum structure according to the present invention. FIG. 12 is a block diagram showing the example of the minimum structure according to the present invention. An image conversion parameter calculation device according to the present invention includes pixel selection means 2 and parameter derivation means 6.

The pixel selection means 2 randomly selects a pixel of a predetermined number or pixel of not more than the predetermined number from a first image.

The parameter derivation means 6 derives a conversion parameter by performing processing for selected pixels which are the pixels selected by the pixel selection means 2, the conversion parameter being a parameter for converting, to the first image, a second image that is subject to image alignment with the first image.

According to this structure, the pixel selection means 2 randomly selects at most the predetermined number of pixels from the first image, and the conversion parameter is derived by performing processing for the selected pixels. Thus, the number of selected pixels is limited to a fixed number or less without depending on the size of the template image, as a result of which the processing cost of conversion parameter calculation can be kept within a fixed cost. Moreover, since the pixels are randomly selected, it is possible to prevent the pixel values of the selected pixels from being biased even when there is periodicity in pixel value of the template image. This allows the conversion parameter to be calculated with high accuracy.

The characteristic structure of the image conversion parameter calculation device as described in the following (Supplementary note 1) to (Supplementary note 12) is disclosed in the above exemplary embodiments.

(Supplementary note 1) An image conversion parameter calculation device comprising: pixel selection means for randomly selecting a pixel of a predetermined number or pixel of not more than the predetermined number from a first image; and parameter derivation means for deriving a conversion parameter by performing processing for selected pixels which are the pixels selected by the pixel selection means, the conversion parameter being a parameter for converting, to the first image, a second image that is subject to image alignment with the first image.

(Supplementary note 2) The image conversion parameter calculation device according to Supplementary note 1, wherein the pixel selection means includes: pixel extraction means for randomly extracting a pixel from the first image; and criterion determination means for determining whether or not the pixel extracted by the pixel extraction means satisfies a predetermined criterion, and selecting the pixel as a pixel used for deriving the conversion parameter on a condition that the pixel satisfies the criterion.

(Supplementary note 3) The image conversion parameter calculation device according to Supplementary note 2, wherein the criterion determination means determines, based on a partial derivative in the pixel extracted by the pixel extraction means, whether or not the pixel satisfies the criterion.

(Supplementary note 4) The image conversion parameter calculation device according to Supplementary note 2, wherein the criterion determination means determines whether or not the pixel extracted by the pixel extraction means is a pixel in a noise region in the first image, and selects the pixel as the pixel used for deriving the conversion parameter on a condition that a criterion that the pixel is not the pixel in the noise region is satisfied.

(Supplementary note 5) The image conversion parameter calculation device according to any one of Supplementary notes 1 to 4, comprising moving object pixel determination means for determining, using the conversion parameter derived by the parameter derivation means, a selected pixel which is a pixel in a region of a moving object from among the selected pixels selected by the pixel selection means, and removing the selected pixel determined as the pixel in the region of the moving object from the selected pixels selected by the pixel selection means, wherein the parameter derivation means derives the conversion parameter for converting the second image to the first image again, by performing processing for selected pixels remaining without being removed by the moving object pixel determination means.

(Supplementary note 6) The image conversion parameter calculation device according to any one of Supplementary notes 1 to 5, wherein the parameter derivation means includes: differentiation means (e.g. the differentiation means 31 in Exemplary Embodiment 3) for calculating a derivative in each of the selected pixels selected by the pixel selection means; second differentiation means (e.g. the second differentiation means 31*b* in Exemplary Embodiment 3) for calculating a derivative in each of the selected pixels using pixel values of a wider range of pixels than the differentiation means; parameter update calculation preprocessing means (e.g. the parameter update calculation preprocessing means 32) for calculating a Jacobian matrix in each of the selected pixels selected by the pixel selection means and a Hessian matrix relating to a selected pixel set; and parameter calculation means for repeatedly updating the conversion parameter using the derivative, the Jacobian matrix, and the Hessian matrix in the selected pixel, until a predetermined convergence determination condition is satisfied, wherein the second differentiation means calculates a derivative in each of the selected pixels, the parameter update calculation preprocessing means calculates a Jacobian matrix and a Hessian matrix using the derivative, the parameter calculation means performs first parameter update repetition processing using the derivative, the Jacobian matrix, and the Hessian matrix, the differentiation means calculates a derivative in each of the selected pixels, the parameter update calculation preprocessing means calculates a Jacobian matrix and a Hessian matrix using the derivative, and the parameter calculation means performs second parameter update repetition processing using the derivative, the Jacobian matrix, and the Hessian matrix.

(Supplementary note 7) An image conversion parameter calculation device comprising: a pixel selection unit for randomly selecting a pixel of a predetermined number or pixel of not more than the predetermined number from a first image; and a parameter derivation unit for deriving a conversion parameter by performing processing for selected pixels which are the pixels selected by the pixel selection unit, the conversion parameter being a parameter for converting, to the first image, a second image that is subject to image alignment with the first image.

(Supplementary note 8) The image conversion parameter calculation device according to Supplementary note 7, wherein the pixel selection unit includes: a pixel extraction unit for randomly extracting a pixel from the first image; and a criterion determination unit for determining whether or not the pixel extracted by the pixel extraction unit satisfies a predetermined criterion, and selecting the pixel as a pixel used for deriving the conversion parameter on a condition that the pixel satisfies the criterion.

(Supplementary note 9) The image conversion parameter calculation device according to Supplementary note 8, wherein the criterion determination unit determines, based on a partial derivative in the pixel extracted by the pixel extraction unit, whether or not the pixel satisfies the criterion.

(Supplementary note 10) The image conversion parameter calculation device according to Supplementary note 8, wherein the criterion determination unit determines whether or not the pixel extracted by the pixel extraction unit is a pixel in a noise region in the first image, and selects the pixel as the pixel used for deriving the conversion parameter on a condition that a criterion that the pixel is not the pixel in the noise region is satisfied.

(Supplementary note 11) The image conversion parameter calculation device according to Supplementary note 7, comprising a moving object pixel determination unit for determining, using the conversion parameter derived by the parameter derivation unit, a selected pixel which is a pixel in a region of a moving object from among the selected pixels selected by the pixel selection unit, and removing the selected pixel determined as the pixel in the region of the moving object from the selected pixels selected by the pixel selection unit, wherein the parameter derivation unit derives the conversion parameter for converting the second image to the first image again, by performing processing for selected pixels remaining without being removed by the moving object pixel determination unit.

(Supplementary note 12) The image conversion parameter calculation device according to Supplementary note 7, wherein the parameter derivation unit includes: a differentiation unit (e.g. the differentiation means 31 in Exemplary Embodiment 3) for calculating a derivative in each of the selected pixels selected by the pixel selection unit; a second differentiation unit (e.g. the second differentiation means 31*b* in Exemplary Embodiment 3) for calculating a derivative in each of the selected pixels using pixel values of a wider range of pixels than the differentiation unit; a parameter update calculation preprocessing unit (e.g. the parameter update calculation preprocessing means 32) for calculating a Jacobian matrix in each of the selected pixels selected by the pixel selection unit and a Hessian matrix relating to a selected pixel set; and a parameter calculation unit for repeatedly updating the conversion parameter using the derivative, the Jacobian matrix, and the Hessian matrix in the selected pixel, until a predetermined convergence determination condition is satisfied, wherein the second differentiation unit calculates a derivative in each of the selected pixels, the parameter update calculation preprocessing unit calculates a Jacobian matrix and a Hessian matrix using the derivative, the parameter calculation unit performs first parameter update repetition processing using the derivative, the Jacobian matrix, and the Hessian matrix, the differentiation unit calculates a derivative in each of the selected pixels, the parameter update calculation preprocessing unit calculates a Jacobian matrix and a Hessian matrix using the derivative, and the parameter calculation unit performs second parameter update repetition processing using the derivative, the Jacobian matrix, and the Hessian matrix.

While the present invention has been described with reference to the above exemplary embodiments, the present invention is not limited to the above exemplary embodiments. Various changes understandable by those skilled in the art within the scope of the present invention can be made to the structures and details of the present invention.

This application claims priority based on Japanese Patent application No. 2009-223038 filed on Sep. 28, 2009, the disclosure of which is incorporated herein in its entirety.

INDUSTRIAL APPLICABILITY

The present invention is preferably applied to an image conversion parameter calculation device for calculating an image conversion parameter in image alignment.

REFERENCE SIGNS LIST 1, 1a, 1b, 1c image conversion parameter calculation device
2, 2a pixel selection means
3, 3b, 3c preprocessing means
4, 4c parameter calculation means
5 selected pixel storage means
6, 6b, 6c parameter derivation means
7 moving object pixel determination means
21 pixel extraction means
22 criterion determination means
31, 31c differentiation means
31b second differentiation means
32, 32c parameter update calculation preprocessing means
41, 41c converted pixel value calculation means
42, 42c error calculation means
43, 43c parameter update calculation means
44, 44c parameter update means
45, 45c condition determination means

The invention claimed is:

1. An image conversion parameter calculation device comprising:
a pixel selection unit which randomly selects pixels of a predetermined number or pixels of not more than the predetermined number from a first image; and
a parameter derivation unit which derives a conversion parameter concerning the selected pixels selected by the pixel selection unit, the conversion parameter being a parameter for converting, to the first image, a second image that is subject to image alignment with the first image, by repeatedly performing as follows, until a conversion parameter update becomes to be smaller than a first threshold;
calculating the conversion parameter update by calculating, for each selected pixel, a product of a transposed matrix of a sub-product of derivative for each selected pixel and a Jacobian matrix in each of the selected pixels, and an error between pixel value at a converted pixel location when converting the pixel in the second image corresponding to the selected pixel and pixel value of the selected pixel in the first image, and
calculating a sum of the products,
and
updating the conversion parameter, by composition of the conversion parameter for converting the pixel in the second image with the conversion parameter update,
wherein the pixel selection unit includes:
a pixel extraction unit which randomly extracts a pixel from the first image; and
a criterion determination unit which determines whether or not a partial derivative in the pixel extracted by the pixel extraction unit is not smaller than a second threshold, and selecting the pixel as a pixel used for deriving the conversion parameter on a condition that the partial derivative is not smaller than the second threshold.

2. The image conversion parameter calculation device according to claim 1, further comprising
a moving object pixel determination unit which determines, using the conversion parameter derived by the parameter derivation unit, a selected pixel which is a pixel in a region of a moving object from among the selected pixels selected by the pixel selection unit, and removing the selected pixel determined as the pixel in the region of the moving object from the selected pixels selected by the pixel selection unit,
wherein the parameter derivation unit derives the conversion parameter for converting the second image to the first image again, by performing processing for selected pixels remaining without being removed by the moving object pixel determination unit.

3. The image conversion parameter calculation device according to claim 1, wherein the parameter derivation unit includes:
a differentiation unit which calculates a derivative in each of the selected pixels selected by the pixel selection unit;
a second differentiation unit which calculates a derivative in each of the selected pixels using pixel values of a wider range of pixels than the differentiation unit;
a parameter update calculation preprocessing unit which calculates a Jacobian matrix in each of the selected pixels selected by the pixel selection unit and a Hessian matrix relating to a selected pixel set; and
a parameter calculation unit which repeatedly updates the conversion parameter using the derivative, the Jacobian matrix, and the Hessian matrix in the selected pixel, until a predetermined convergence determination condition is satisfied,
wherein the second differentiation unit calculates a derivative in each of the selected pixels,
the parameter update calculation preprocessing unit calculates a Jacobian matrix and a Hessian matrix using the derivative,
the parameter calculation unit performs first parameter update repetition processing using the derivative, the Jacobian matrix, and the Hessian matrix,
the differentiation unit calculates a derivative in each of the selected pixels, the parameter update calculation preprocessing unit calculates a Jacobian matrix and a Hessian matrix using the derivative, and the parameter calculation unit performs second parameter update repetition processing using the derivative, the Jacobian matrix, and the Hessian matrix.

4. An image conversion parameter calculation device comprising:

a pixel selection unit which randomly selects pixels of a predetermined number or pixels of not more than the predetermined number from a first image; and a parameter derivation unit which derives a conversion parameter concerning the selected pixels selected by the pixel selection unit, the conversion parameter being a parameter for converting, to the first image, a second image that is subject to image alignment with the first image, by repeatedly performing as follows, until a conversion parameter update becomes to be smaller than a first threshold;

calculating the conversion parameter update by calculating, for each selected pixel, a product of a transposed matrix of a sub-product of derivative for each selected pixel and a Jacobian matrix in each of the selected pixels, and an error between pixel value at a converted pixel location when converting the pixel in the second image corresponding to the selected pixel and pixel value of the selected pixel in the first image, and calculating a sum of the products, and updating the conversion parameter, by composition of the conversion parameter for converting the pixel in the second image with the conversion parameter update, wherein the pixel selection unit includes:

a pixel extraction unit which randomly extracts a pixel from the first image; and a criterion determination unit which determines whether or not the pixel extracted by the pixel extraction unit is a pixel in a noise region in the first image by using a bilateral filter, and selects the pixel as the pixel used for deriving the conversion parameter on a condition that the pixel is not a pixel in the noise region.

5. An image conversion parameter calculation method comprising:

randomly selecting pixels of a predetermined number or pixels of not more than the predetermined number from a first image; and deriving a conversion parameter concerning the selected pixels, the conversion parameter being a parameter for converting, to the first image, a second image that is subject to image alignment with the first image, by repeatedly performing as follows, until a conversion parameter update becomes to be smaller than a first threshold;

calculating the conversion parameter update by calculating, for each selected pixel, a product of a transposed matrix of a sub-product of derivative for each selected pixel and a Jacobian matrix in each of the selected pixels, and an error between pixel value at a converted pixel location when converting the pixel in the second image corresponding to the selected pixel and pixel value of the selected pixel in the first image, and calculating a sum of the products, and updating the conversion parameter, by composition of the conversion parameter for converting the pixel in the second image with the conversion parameter update, and randomly extracting a pixel from the first image; and determining whether or not a partial derivative in the extracted pixel is not smaller than a second threshold, and selecting the pixel as a pixel used for deriving the conversion parameter on a condition that the partial derivative is not smaller than the second threshold.

6. An image conversion parameter calculation method comprising:

randomly selecting pixels of a predetermined number or pixels of not more than the predetermined number from a first image; and deriving a conversion parameter concerning the selected pixels, the conversion parameter being a parameter for converting, to the first image, a second image that is subject to image alignment with the first image, by repeatedly performing as follows, until a conversion parameter update becomes to be smaller than a first threshold;

calculating the conversion parameter update by calculating, for each selected pixel, a product of a transposed matrix of a sub-product of derivative for each selected pixel and a Jacobian matrix in each of the pixels, and an error between pixel value at a converted pixel location when converting the pixel in the second image corresponding to the selected pixel and pixel value of the selected pixel in the first image, and calculating a sum of the products, and updating the conversion parameter, by composition of the conversion parameter for converting the pixel in the second image with the conversion parameter update, and randomly extracting a pixel from the first image; and determining whether or not the extracted pixel is a pixel in a noise region in the first image by using a bilateral filter, and selects the pixel as the pixel used for deriving the conversion parameter on a condition that the pixel is not a pixel in the noise region.

7. A non-transitory computer readable information recording medium storing an image conversion parameter calculation program, when executed by a processor, performs a method for:

selecting pixels of a predetermined number or pixels of not more than the predetermined number from a first image; and deriving a conversion parameter concerning the selected pixels, the conversion parameter being a parameter for converting, to the first image, a second image that is subject to image alignment with the first image, by repeatedly performing as follows, until a conversion parameter update becomes to be smaller than a first threshold;

calculating the conversion parameter update by calculating, for each selected pixel, a product of a transposed matrix of a sub-product of derivative for each selected pixel and a Jacobian matrix in each of the selected pixels, and an error between pixel value at a converted pixel location when converting the pixel in the second image corresponding to the selected pixel and pixel value of the selected pixel in the first image, and calculating a sum of the products, and
- updating the conversion parameter, by composition of the conversion parameter for converting the pixel in the second image with the conversion parameter update, and
- randomly extracting a pixel from the first image; and
- determining whether or not a partial derivative in the pixel extracted by the extraction pixel is not smaller than a second threshold, and selecting the pixel as a pixel used for deriving the conversion parameter on a condition that the partial derivative is not smaller than the second threshold.

8. A non-transitory computer readable information recording medium storing an image conversion parameter calculation program, when executed by a processor, performs a method for:
- randomly selecting pixels of a predetermined number or pixels of not more than the predetermined number from a first image; and
- deriving a conversion parameter concerning the selected pixels, the conversion parameter being a parameter for converting, to the first image, a second image that is subject to image alignment with the first image, by repeatedly performing as follows, until a conversion parameter update becomes to be smaller than a first threshold;
- calculating the conversion parameter update by
  - calculating, for each selected pixel, a product of a transposed matrix of a sub-product of derivative for each selected pixel and a Jacobian matrix in each of the selected pixels, and an error between pixel value at a converted pixel location when converting the pixel in the second image corresponding to the selected pixel and pixel value of the selected pixel in the first image, and
  - calculating a sum of the products, and
- updating the conversion parameter, by composition of the conversion parameter for converting the pixel in the second image with the conversion parameter update, and
randomly extracting a pixel from the first image; and
determining whether or not the extracted pixel is a pixel in a noise region in the first image by using a bilateral filter, and selects the pixel as the pixel used for deriving the conversion parameter on a condition that the pixel is not a pixel in the noise region.

\* \* \* \* \*